(12) United States Patent
Samji et al.

(10) Patent No.: US 7,765,229 B2
(45) Date of Patent: Jul. 27, 2010

(54) SINGLE VIEW OF DATA IN A NETWORKED COMPUTER SYSTEM WITH DISTRIBUTED STORAGE

(75) Inventors: Mohammed Samji, Bellevue, WA (US); John Brezak, Woodinville, WA (US); Anil Kumar Yadav, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 374 days.

(21) Appl. No.: 11/179,433

(22) Filed: Jul. 12, 2005

(65) Prior Publication Data

US 2007/0016586 A1    Jan. 18, 2007

(51) Int. Cl.
G06F 7/00 (2006.01)
G06F 17/30 (2006.01)

(52) U.S. Cl. ..................................... 707/770
(58) Field of Classification Search ................ 707/10
See application file for complete search history.

(56) References Cited

U.S. PATENT DOCUMENTS

| | | | |
|---|---|---|---|
| 5,388,257 A * | 2/1995 | Bauer | 707/1 |
| 5,590,319 A * | 12/1996 | Cohen et al. | 707/4 |
| 5,668,986 A * | 9/1997 | Nilsen et al. | 707/10 |
| 5,708,812 A | 1/1998 | Van Dyke et al. | |
| 5,968,121 A | 10/1999 | Logan et al. | |
| 6,049,809 A | 4/2000 | Raman et al. | |
| 6,751,634 B1 | 6/2004 | Judd | |
| 6,879,564 B2 | 4/2005 | Parham et al. | |
| 2002/0184361 A1 * | 12/2002 | Eden | 709/224 |
| 2002/0194171 A1 | 12/2002 | Judd et al. | |
| 2003/0018694 A1 | 1/2003 | Chen et al. | |
| 2004/0003086 A1 | 1/2004 | Parham et al. | |
| 2004/0210767 A1 | 10/2004 | Sinclair et al. | |
| 2005/0060584 A1 | 3/2005 | Ginter et al. | |
| 2005/0091337 A1 | 4/2005 | Reasor et al. | |
| 2005/0114777 A1 * | 5/2005 | Szeto | 715/710 |
| 2005/0262097 A1 * | 11/2005 | Sim-Tang et al. | 707/10 |
| 2006/0020599 A1 * | 1/2006 | Martin et al. | 707/9 |
| 2006/0179153 A1 * | 8/2006 | Lee et al. | 709/231 |

(Continued)

OTHER PUBLICATIONS

Bonnet et al., "Partial Answers for Unavailable Data Sources," Springer-Verlag Berlin Heidelberg, 1998.*

(Continued)

Primary Examiner—Pierre M Vital
Assistant Examiner—Rachel J Lee
(74) Attorney, Agent, or Firm—Shook, Hardy & Bacon L.L.P.

(57) ABSTRACT

A host computer system obtains a request for an aggregated view of content in a computer network corresponding to a criterion. The host computer system queries networked computer systems to identify data objects according to the criterion. Each responding computer system provides an identification set of specified data objects that are stored at the responding computer to the host computer systems. The host computer system merges the identification sets to form the aggregated view of content to a user. If a specified data object is replicated to networked computers, the host computer system provides one instance of the specified data object in the query result. Consequently, concurrent utilization of file synchronization and the aggregated view of data objects are facilitated. If a specified data object is stored at the host computer system, the host computer system blocks querying of networked computers about the specified data object.

18 Claims, 20 Drawing Sheets

U.S. PATENT DOCUMENTS

2006/0218123 A1* 9/2006 Chowdhuri et al. ............ 707/2

OTHER PUBLICATIONS

Luo et al., "Middle-Tier Database Caching for e-Business," ACM, 2002.*
Thomas et al., "Heterogeneous Distributed Database Systems for Production Use," ACM, 1990.*
Hevner et al., "Query Processing in Distributed Database Systems," IEEE, 1979.*
Thekkath et al., "Frangipani: A Scalable Distributed File System," ACM, 1997.*
Haas et al., "Optimizing Queries across Diverse Data Sources," Proceedings of the 23rd VLDB Conference, 1997.*
U.S. Appl. No. 11/111,895 "System and Method for Peer to Peer Synchronization of Files".
Chervenak, Ann et al. High-performance remote access to climate simulation data; a challenge problem for data grid technologies. In Parallel Computing archive, vol. 29, Issue 10 (Oct. 2003)—Special issue: High performance computing with geographical data, pp. 1335 1356. Year of Publication: 2003. [retrieved on Jul. 4, 2007]. Retrieved from the Internet: <URL: http://www.isl.edu/-deelman/parallelComputingESG.pdf>.
PCT Application No. PCT/US2006/27073; Filed: Jul. 10, 2006; PCT Notification of Transmittal of international Search Report and the Written Opinion of the International Searching Authority, or the Declaration, mailed Mar. 24, 2008.

* cited by examiner

SINGLE VIEW OF DATA IN A NETWORKED COMPUTER SYSTEM WITH DISTRIBUTED STORAGE

BACKGROUND

With the ubiquity of personal computers, users often own or use more than one machine. For example, many business and personal users own or use both a desktop machine and a laptop computer or other mobile client device. Users who own or have access to multiple machines may use different machines at different times for different purposes, yet still frequently desire to query or access commonly used files or other content on all those machines. Applications, databases and other resources typically lack the capability that supports a user to roam or share files among a common group of machines In a managed computing network environment, common to business and other large-scale computing networks, the computing network includes a centralized network authority, such as a primary domain controller, that regulates user access by maintaining passwords and permissions. The centralized network authority can also manage access to locally stored data files to authorized users of the network.

In contrast to the managed computing networks, unmanaged computing networks, common to homes and other small-scale networks, do not typically incorporate a primary domain controller for regulating user access or centralized data file storage. Instead, many unmanaged computing networks require individual user management in terms of regulating user security authorization to use the various computing devices on the network. Further, most unmanaged networks require additional user participation and knowledge to store and recall content stored on the various computing devices on the network.

The creation of shared storage locations on one of the networked computing devices is one attempt to provide for a more centralized storage of data in both managed and unmanaged networks. The shared storage location can serve as a designated store for data, regardless of which of the networked computing devices a user is currently using. Although this approach attempts to centralize storage, the approach may become deficient in that users are required to remember the location and name of the centralized shared storage location. Further, in the event that the shared storage location is renamed, moved or otherwise modified, users may be unable to access desired content.

The maintenance of roaming user profiles that define where data is stored is another approach for a more centralized storage of data files in managed networks. Although a roaming user profile would assist in locating data files stored in various locations, the storage and update of the roaming profiles provides a greater burden on the processing and memory resources of the computer network. Accordingly, as the number of networked computing devices increases, the burden of a roaming user profile would also increase.

The redirection of local file system actions to a designated storage location on the network is a further approach for a more centralized storage of data files in both managed and unmanaged networks. For example, a request for the contents of a local storage location may be redirected automatically to retrieve the contents of a designated storage location on the network, which may be remote from the computing device. Similarly, a request to store data locally may be redirected automatically to store the selected content at the designated storage location on the network. Although this approach would allow all data requests to be directed towards a central storage location without requiring the user to know the location of the designated location, the approach prevents the storage and retrieval of content on the local machines. Further, in the event that the designated storage location is renamed, moved or otherwise modified, users would be unable to access desired content.

The user often desires to work with the most up-to-date or complete version of a given file, no matter what machine they happen to be using.

SUMMARY

A host computer system obtains a request for an aggregated view of content in a computer network corresponding to a criterion. The host computer system queries networked computer systems to identify data objects according to the criterion. Each responding computer system provides an identification set of specified data objects that is stored at the responding computer. The host computer system merges the identification sets to form the aggregated view of content provided to a user.

In accordance with an illustrative aspect of the invention, if a specified data object is replicated to networked computers, the host computer system provides one instance of the specified data object in the query result. Consequently, the concurrent utilization of file synchronization and the aggregated view of data objects can be facilitated.

In accordance with another illustrative aspect of the invention, if a specified data object is stored on the host computer system, the host computer system blocks querying of the networked computers about the specified data object.

In accordance with still another illustrative aspect of the invention, a computer system queries networked computers about data objects distributed in a computer network. The computer system includes a content query service module that receives a request to identify specified data objects, obtains identification sets of the specified data objects stored on the networked computers, deletes multiple identifications of replicated data objects, and merges the identifications sets to provide an aggregated view of content to the user.

In accordance with another illustrative aspect of the invention, file synchronization may be invoked in response to the aggregated view of files in order to replicate files that appear in the aggregated list at a computer system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF DRAWINGS

The foregoing summary of the invention, as well as the following detailed description of exemplary embodiments, is better understood when read in conjunction with the accompanying drawings, which are included by way of example, and not by way of limitation with regard to the claimed invention.

DETAILED DESCRIPTION

Figure 1:
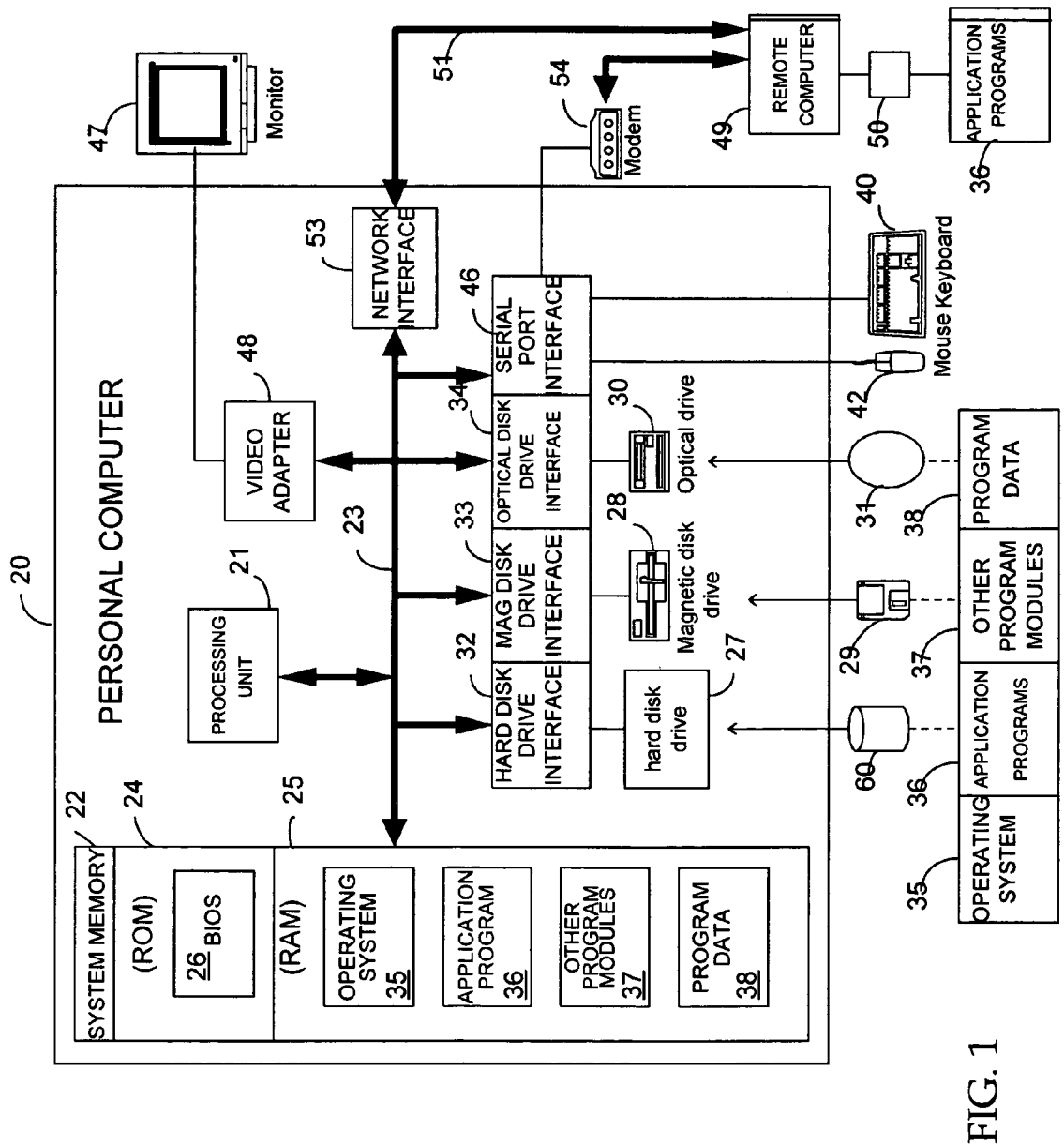
FIG. 1 is a functional block diagram of an example of a conventional general-purpose digital computing environment that can be used to implement various aspects of the present invention.

Generally described, aspects of the present invention correspond to a system and method for generating aggregated views of content stored in various computing devices in a computer network. Some specific aspects of the present invention correspond to a system and method for automatically querying computing devices in a defined network and generating a view of the merged query responses. Although the present invention will be described with regard to a computing device network in which all the network computing devices have common security profiles for all authorized users of the network, one skilled in the relevant art will appreciate that the present invention may be implemented in alternative computing networks in which each computing device may maintain separate security profiles for authorized network users. Further, one skilled in the relevant art will appreciate that some or all of the aspects of the present invention may be practiced in managed computer networks having a centralized network authority for regulating user access. Accordingly, the embodiments described with regard to the present invention are illustrative in nature and should not be construed as limiting.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

The following description begins with a description of a general-purpose computing device that may be used in a secured network group in accordance with some aspects of the invention. Turning now to FIG. 1, a general purpose computing device is shown in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
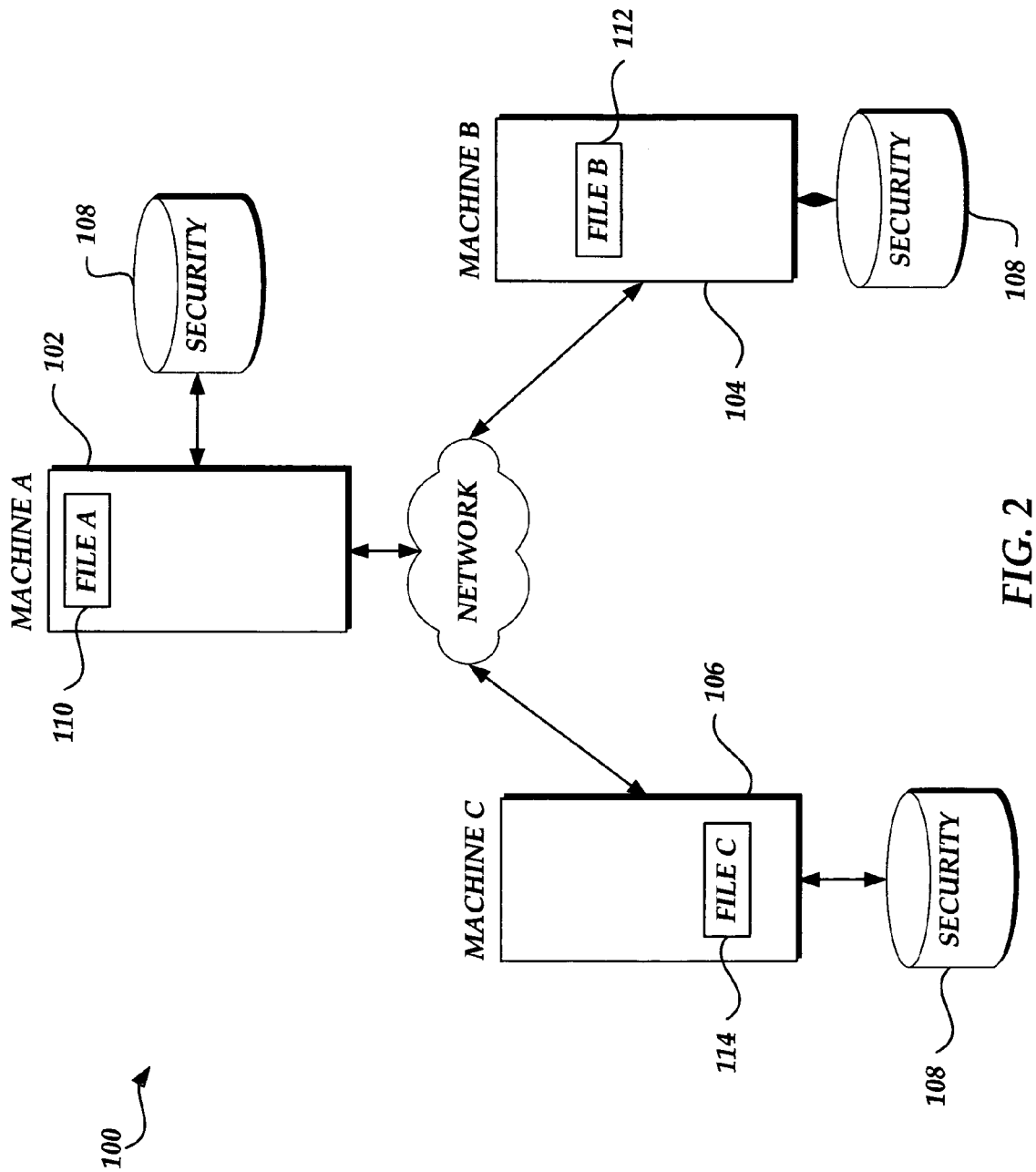
FIG. 2 is a block diagram of an unmanaged computer network including three computing devices locally storing varied content in accordance with an illustrative aspect of the present invention.

FIG. 2 is a block diagram illustrative of a computer network 100 including three computing devices 102, 104, and 106 in accordance with illustrative aspects of the present invention. The computing devices 102, 104, 106 may be embodied as any one of a variety of devices that may be utilized to persist content to the computer network 100. Examples of computing devices include, but are not limited to, personal computing devices, hand-held computing devices, server-based computing devices, personal digital assistants, mobile telephones, stand-alone memory devices, electronic devices having some type of memory, and the like.

In an illustrative embodiment of the present invention, each computing device 102, 104 and 106 maintains a database of security information 108 that corresponds to a unique security identifier ("SID") for each authorized user. The database 108 may also maintain information associating unique user SIDs to one or more groups of users, such as administrator, users, reviewers, and a unique security identifier for the group. In accordance with the illustrative embodiment, the security information database 108 is replicated at each of the computing devices 102, 104, 106 such that a user's security profile, including a user SID, is accessible at any one of the computing devices 102, 104, 106.

As illustrated in FIG. 2, for a particular user, a first computing device 102, "MACHINE A", maintains a first file 110, "FILE A", on a local storage location, such as a hard drive or other mass storage device, that can be accessed in some manner by the user. Similarly, a second computing device 104, "MACHINE B" maintains a second file 112, "File B" and a third machine 106, "MACHINE C", maintains a third file 114, "File C", both of which can be accessed in some manner by the user. (Computing devices 102, 104, and 106 may be personal computers as shown in FIG. 1.) As will be explained in additional detail below, in an illustrative embodiment of the present invention, each file 110, 112, 114 maintains an access control list ("ACL") that indicates which user SIDs and group SIDs that have permission to access to the particular file. Additionally, each file ACL may also indicate limitations to the type of access a particular user SID or group SID may have. For example, a file ACL may indicate that a particular user may access a file to read the file, but cannot modify the file in any manner. Further, each file ACL may also indicate a current owner of the file corresponding to the user SID that created the file and/or last edited the file. However, under conventional data management approaches, the user would have to remember the precise location of each piece of data to access the data remotely. Although the management of the data is described with regard to an ACL, one skilled in the relative art will appreciate that additional data management, such as security encryption, digital rights management, and the like, may also be utilized.

Figure 3:
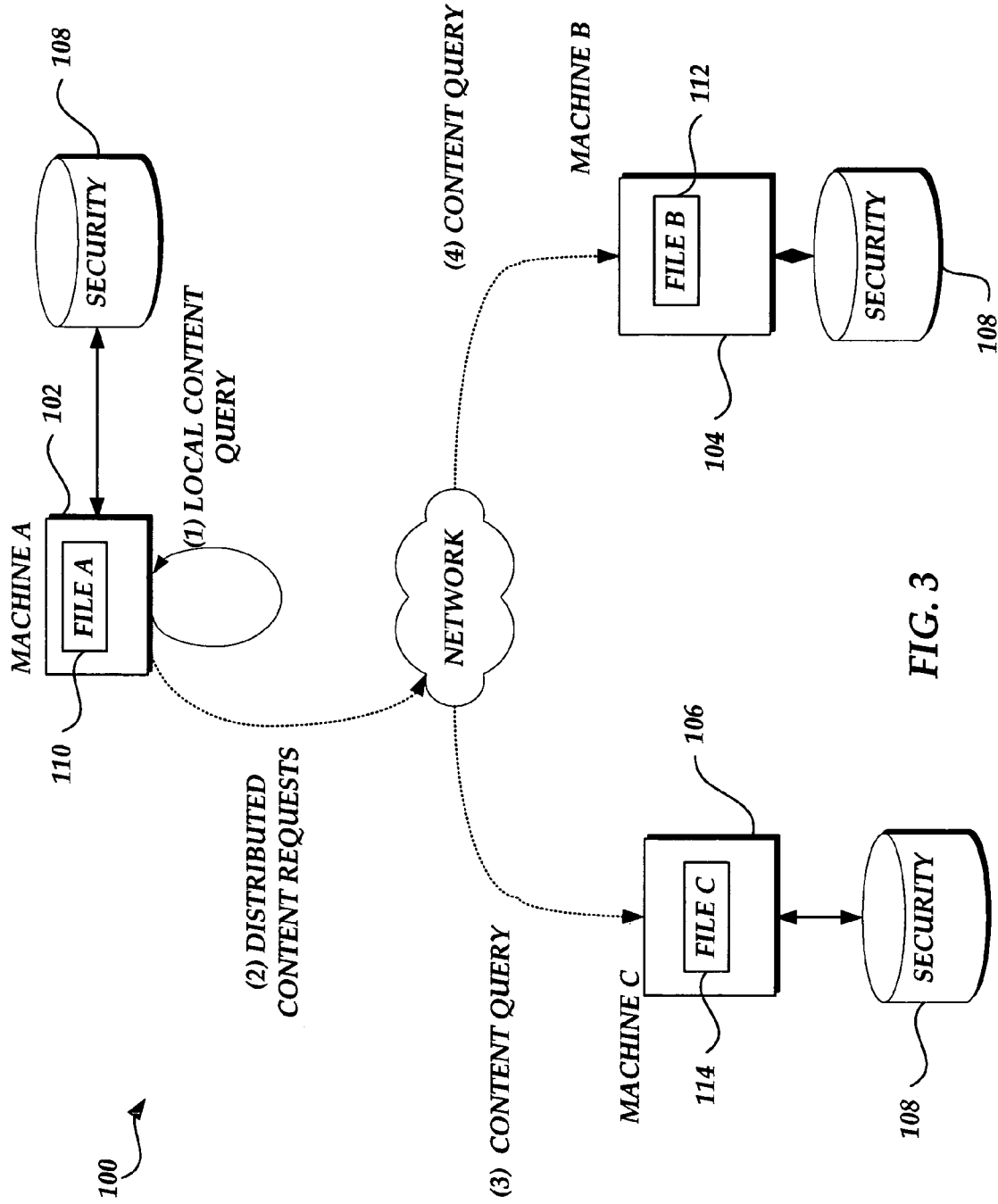
FIG. 3 is a block diagram of the computer network of FIG. 2 illustrating the initiation of a user data request and content query in accordance with an illustrative aspect of the present invention.
Figure 4:
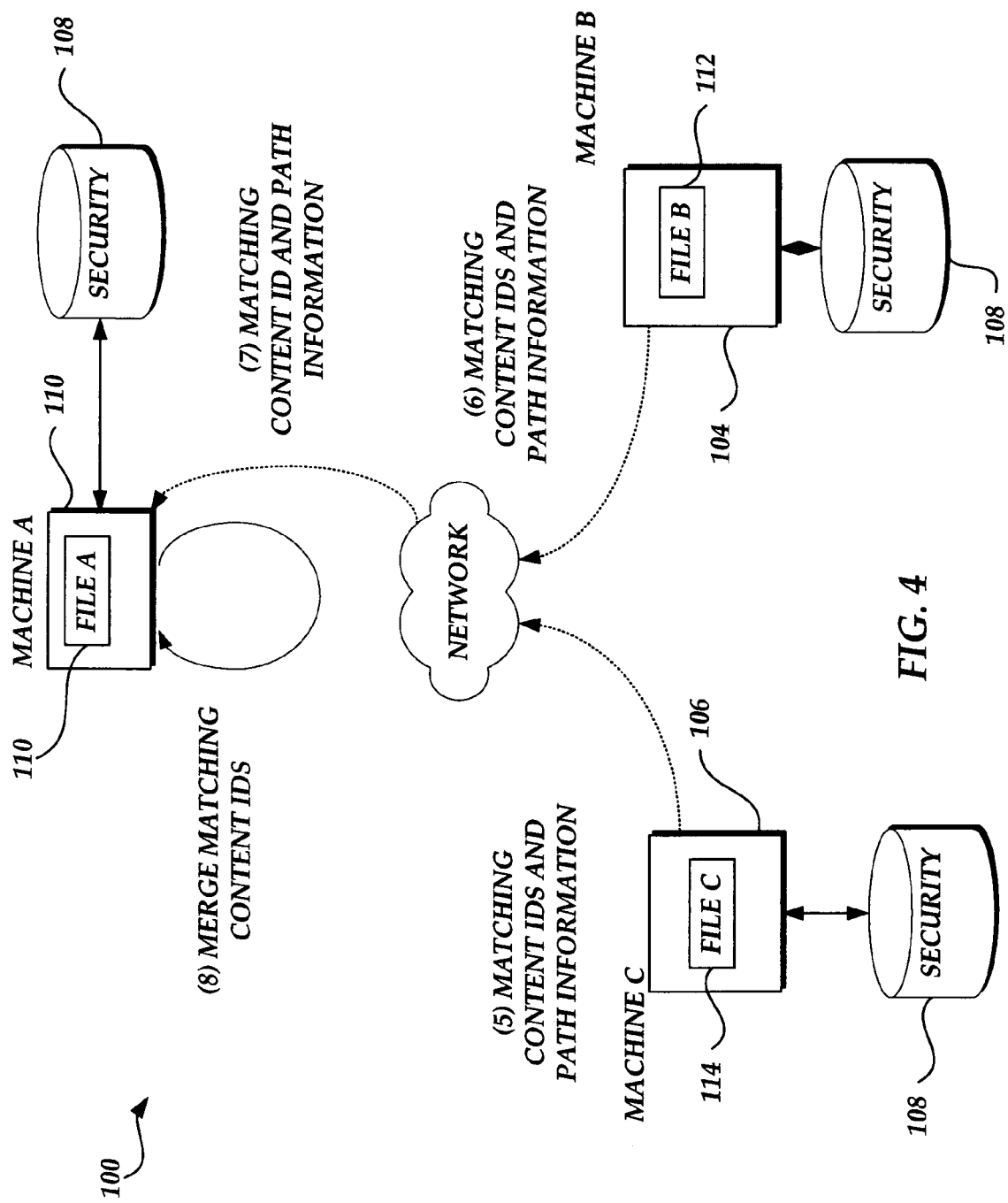
FIG. 4 is a block diagram of the computer network of FIG. 2 illustrating the return and merging of matching content identifiers from the networked computing devices in accordance with an illustrative aspect of the present invention.
Figure 5:
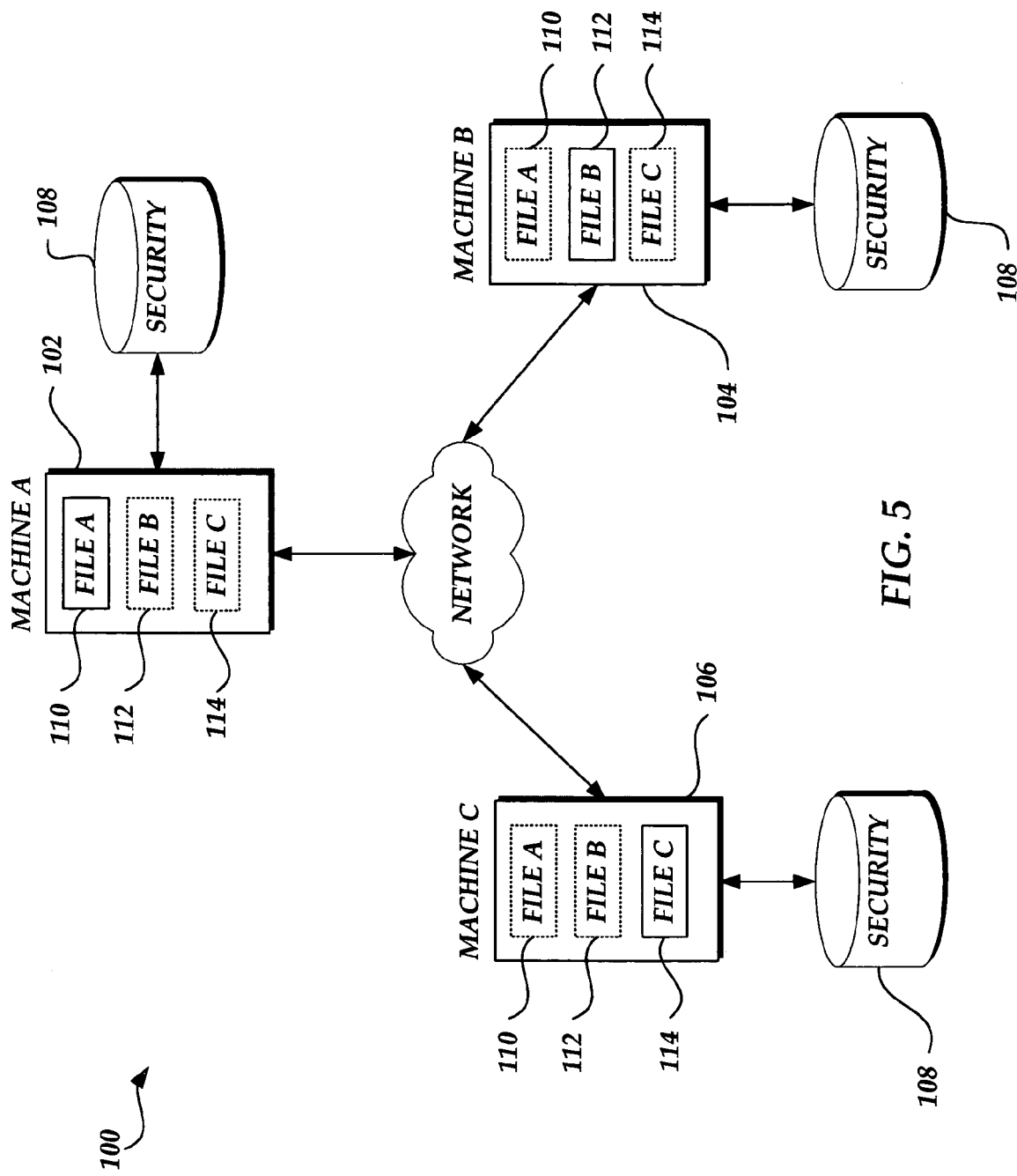
FIG. 5 is a block diagram of the computer network of FIG. 2 illustrating the result of processing aggregated view requests at each computing device in the network in accordance with an illustrative aspect of the present invention.

Referring to FIGS. 3-5, the initiation and processing of an aggregated view request among the three computing devices 102, 104 and 106 of the computer network 100 will be described. With reference to FIG. 3, the process is initiated with the receipt of a content identification request at MACHINE A 102 by the user. Based on a unique SID associated with a particular user, or user account, MACHINE A 102 initiates a local content query corresponding the unique SID and any one of a variety of criteria that may used to select data. Examples of criteria include keyword searches, file types, date ranges. Concurrently with the local content query, or after the processing of the local query, MACHINE A 102 automatically initiates a distributed content request to the computing devices 104, 106 in the network 100. Because the security profiles in each computing device in the illustrative network have replicated security profile databases 108, MACHINE A 102 may issue identical content queries to each computing device. Further, although FIG. 3 illustrates that every computing device on the network 100 receives the distributed content query, MACHINE A may also limit the content requests to a subset of computing devices within the network 100.

Referring to FIG. 4, each computing device receiving the content request processes the request and returns information identifying the matching content and the location of the content. For example, in the illustrative example, MACHINE B 104 would return information identifying File B 112 and its specific location within MACHINE B's storage system. Likewise, MACHINE C 106 would return information identifying File C 114 and its specific location within MACHINE C's storage system. In an illustrative embodiment of the present invention, the content located at each computing device is not transmitted to the requesting computing device. Further, as will be explained in greater detail below, previously stored content request responses or cached content request responses may also be processed.

Once the query responses are received by MACHINE A 102, the query results are merged. In an illustrative embodiment of the present invention, the merged results are embodied as single representation of all the matching content without direct reference to the location, or origin, of the content. However, MACHINE A 102 may obtain additional instructions from the user to sort, or otherwise organize, the merged results for the requesting user. For example, MACHINE A 102 may sort the merged content by size, date, origin, and the like. Still further, MACHINE A 102 may associate additional visual cues to the merged results to identify specific pieces of data, such as data stored on a computing device that is not currently available.

FIG. 5 is a block diagram of the computer network 100 of FIG. 2 illustrating the result of processing aggregated view requests at each of the computing devices in the network. For purposes of FIG. 5, it is assumed that each of the computing devices 102, 104, 106 issued aggregated view requests and that the content of each computing device has not been modified. The aggregated view for MACHINE A 102 shows File A 110, File B 112, and File C 114 with File B and File C illustrated in dotted lines to show that they are stored remotely from MACHINE A. Similarly, the aggregated view for MACHINE B 104 shows the identical content with File A 110 and File C 114 illustrated in dotted lines to show that they are stored remotely. Finally, the aggregated view for MACHINE C 106 shows the identical content with File A 110 and File B 112 illustrated in dotted lines to show that they are stored remotely. Based on the aggregated views at each computing device 102, 104, 106, the user could access the same content without requiring knowledge of its actual location. Further, in the event that one or more of the computing devices are not available, the computing device may still show the content stored on the unavailable machine with additional visual cues to indicate that it is not currently available.

Figure 6:
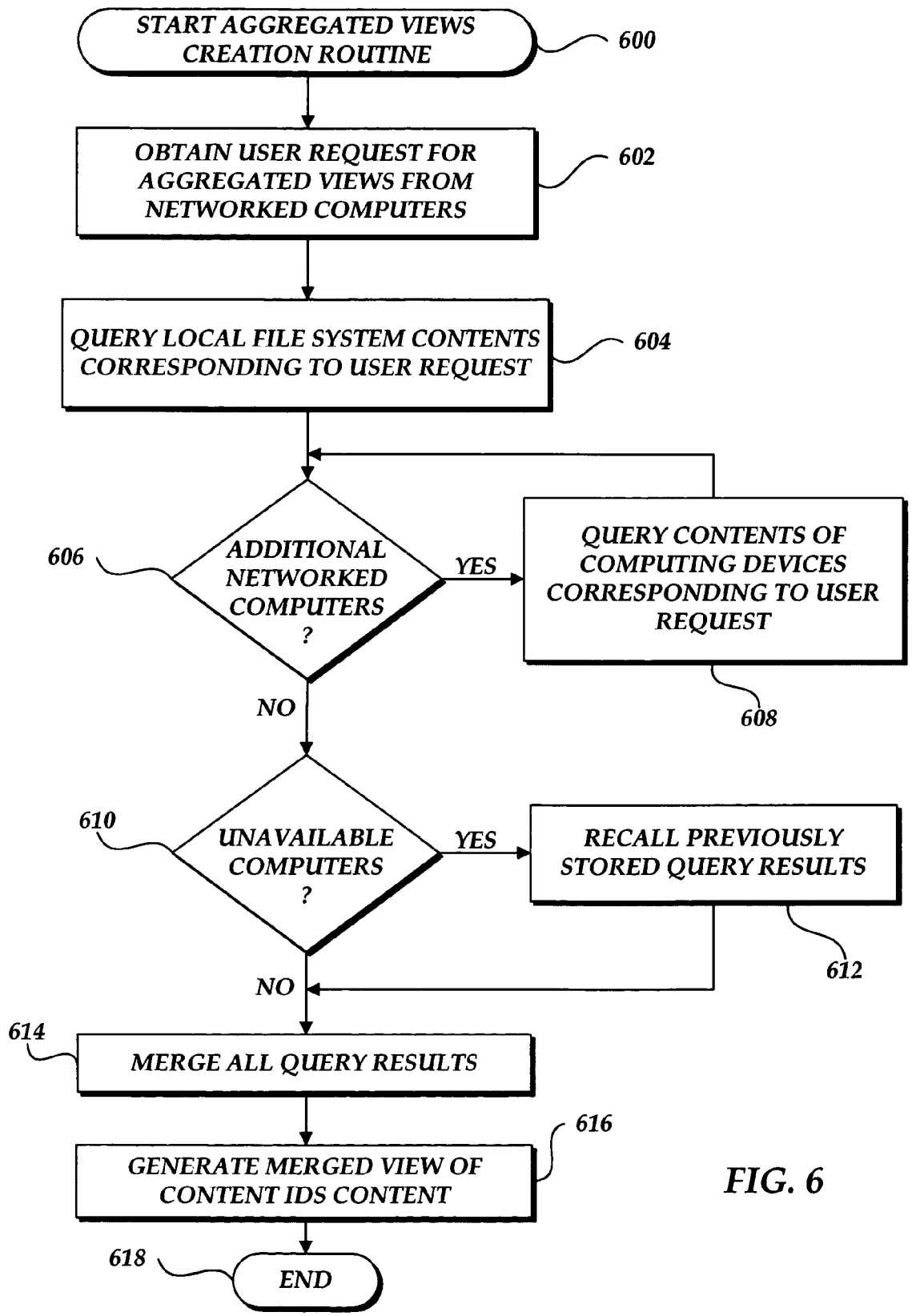
FIG. 6 is a flow diagram illustrative of an aggregated view creation routine implemented by a networked computing device in accordance with an illustrative aspect of the present invention.

FIG. 6 is a flow diagram illustrative of an aggregated view creation routine 600 implemented by a network computing device, such as computing devices 102, 104, 106, in accordance with aspects of the present invention. At block 602, a user request for creating an aggregated view of content is obtained. In an illustrative embodiment of the present invention, the aggregated view request can correspond directly to a user's access to any type of application, or module, displaying content. For example, an aggregated view request may correspond to a request to open a file within a software application program. Similarly, an aggregated view creation request may correspond to the initiation of a file system management program. Still further, the aggregated view request may be automatically generated at the occurrence of specific events, such as at a particular time of day, after a computing device has powered up, after a computing device has connected to the network, and the like.

At block 604, the computing device queries the local computing device file system for content matching a content query. In an illustrative embodiment of the present invention, the content query is in the form of a database query, such as a query function supported by Microsoft Corporation's SQL database. The database query includes a set of criteria for determining matching content. In an illustrative embodiment of the present invention, the query includes a request to match all content in which the user, identified by a user SID security token, can access. Additionally, the query can include any number of additional criteria, such as keyword searches, file types, date ranges, etc., that can be used to match content. The computing device storage system can then accept the query and identify any content that matches the query criteria. One skilled in the relevant art will appreciate that some or all portions of the query string, such as the user SID, may be entered automatically without requiring additional user input. Alternatively, some portion of the query string, such as the additional search criteria, may be specified by user at the time the search is requested or be pre-determined as part of a configuration of the computing device.

At decision block 606, a test is conducted to determine whether there are additional computing devices connected to the network 100. In an illustrative embodiment of the present invention, the test for the additional computing devices may correspond to a polling of every computing device connected to the network. Alternatively, the test for additional computing devices may be limited to a specific subset of computing devices defined by a system administrator or the user. If there are additional computing devices within the network, at block 608, the computing device associated with the user sends content queries to the additional computing device. In an illustrative embodiment of the present invention, because the user's security profile, e.g., SID, is replicated to each computing device, the content query can be identical. Alternatively, if a user's security profile changes, each content query may be unique to accommodate for various user security identifiers. Blocks 606 and 608 will repeat until all the computing devices within the network 100, or subset of computing devices, have been queried. In accordance with an illustrative embodiment of the present invention, the results of the query are transmitted to the requesting computing device in the form of a content identifier and a path for locating the content, such as a Uniform Name Location ("UNC") path. As described above, the content does not need to be moved to the requesting computing device. Additionally, the requesting computing device does not need to make a copy of the content. Further, in an illustrative embodiment of the present invention, the computing device may maintain a copy of a previously received content request reply from the remote computer in memory, such as RAM or cache. In addition to issuing a new content request from the remote computing device, the computing device may recall the previously received content request for the same remote computing device and begin processing the previously received content request. Once the new content request is received, the computing device may update the response and store the new results for subsequent use.

Once all the networked computing devices have been queried, at decision block 610, a test is conducted to determine whether there are any previously networked computing devices that are not currently available. One skilled in the art will appreciate that any number of computing devices may be temporarily unavailable such as being powered down, out of wireless communication range or not currently docked to a network connection. If there are any previously networked computing devices that are not currently available, at block 612, the computing device attempts to recall a previously stored content request result for the unavailable computing device.

Once all of the computing devices have been queried, at block 614, the requesting computing device merges the result of the content queries as an aggregated list. In an illustrative embodiment of the invention, the computing device may filter, or otherwise process, the merged results. Additionally, the computing device may archive, cache or otherwise store, the merged results for use in subsequent aggregated list creation. At block 616, the merged content identifier view is generated and displayed to the user for manipulation. In an illustrative embodiment of the invention, the results of the merging are represented to the users in a flat view including content from all of the computing devices. Further, in the illustrative embodiment, the origin of the content is not initially displayed to the user. However, one skilled in the relevant art will appreciate that the requesting computing device may perform additional filtering or organization to display the matching content to the user. For example, the requesting computing device may sort the matching content by various attributes, such as data size, data type, title, date criteria, and the like. Further, the location of the origin of the content may be provided directly to the user, either as part of the initial view or as part of additional data available on the request of the user. Still further, in the event that one of the computing devices is unavailable, the merged view may be represented to the user with special visual cues, such as transparent icons, to indicate to the user that the content is likely stored on the unavailable computing device but cannot currently be accessed. In another illustrative embodiment, the computing device may utilize a previously stored record of the aggregated view and compare it to a current aggregated view. The computing device can then indicate which files have been modified, removed, or added. At block 618, routine 600 terminates.

Figure 7A:
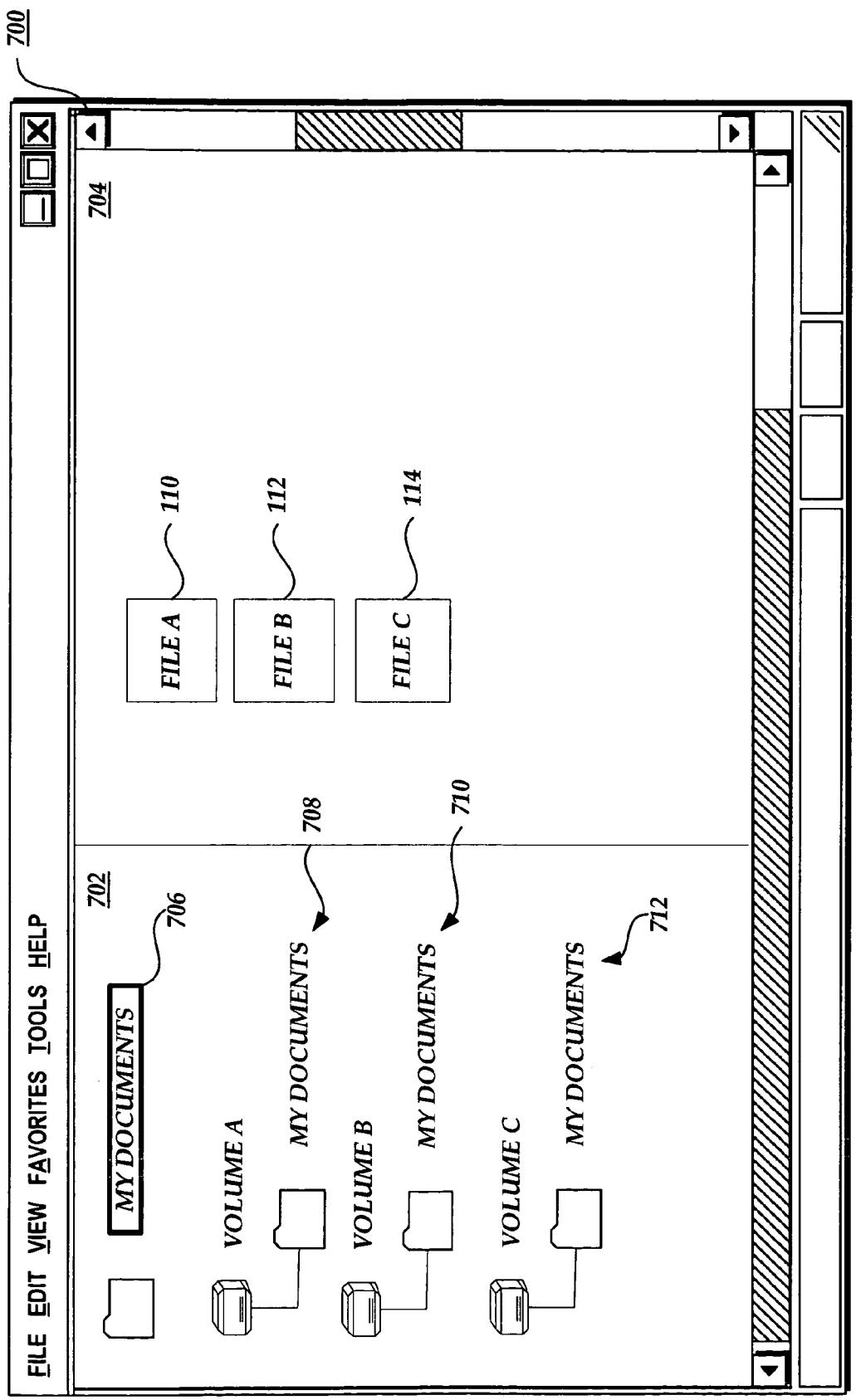
FIGS. 7A-7D are block diagrams illustrative of screen displays for displaying merged content identifiers corresponding to an aggregated view in accordance with an illustrative aspect of the present invention.

FIGS. 7A-7D are block diagrams illustrative of various screen displays for displaying merged content identifiers in an aggregated list view in accordance with an illustrative embodiment of the invention. With reference to FIG. 7A, the screen display 700 can include a first display portion 702 for allowing a user to select various file locations of interest. The screen display 700 can also include a second display portion 704 for displaying specific content stored in a selected file space. With reference to the previous example of FIGS. 2-5, if a user were to initiate an aggregated view request by manipulating the graphical icon 706 corresponding to "My Documents", or otherwise initiating a request to view all files corresponding to the current user, the computing device would execute routine 600. The resulting three files 110, 112, 114 would be then displayed to the user in the second display portion 704 without need for the user to know the origin of the content. In contrast, under traditional file system management, the user would need to access each computing device file system independently to identify the location of each particular file of interest. For example, if files 110, 112 and 114 corresponded to icons 708, 710 and 712 respectively, the user would typically need to access each icon separately to view the same files created by the aggregated view.

Figure 7B:
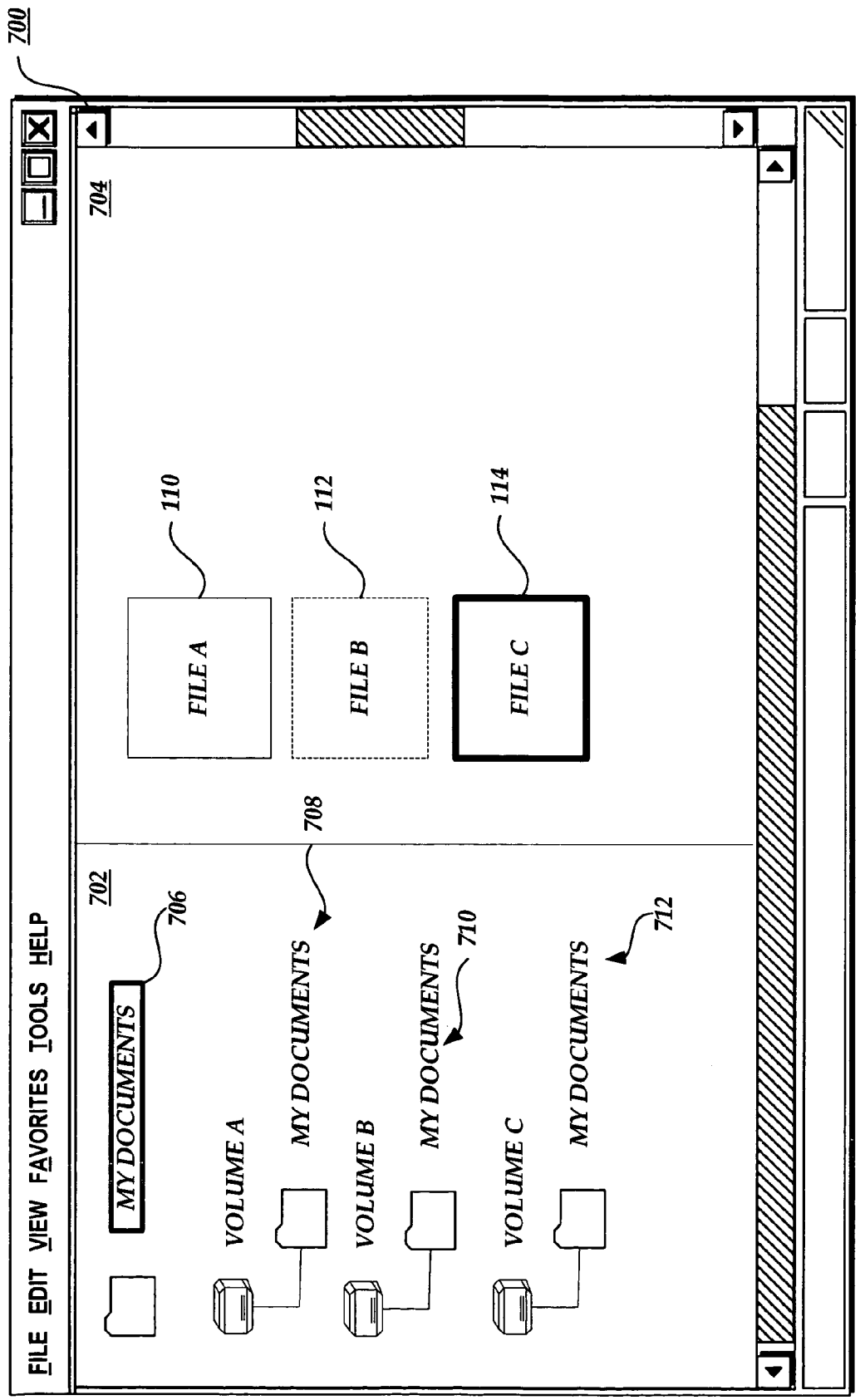

Referring to FIG. 7B, one or more of the content identifiers in the second portion of the screen display 700 may include visual cues to assist the user. For example, if a computing device is not currently connected to the network and the requesting computing device has utilized a previously cached or archived content request, the content may distinguished visually as illustrated for file 112. In an illustrative embodiment of the present invention, unavailable content may be displayed with a dotted border and/or in a semi-transparent manner. In another example, content which has been determined by the computing device to have been modified since a previous aggregated view request may be highlighted to the user as illustrated for file 114. In an illustrative embodiment of the present invention, the modified piece of data may be highlighted on the screen display 700.

Figure 7C:
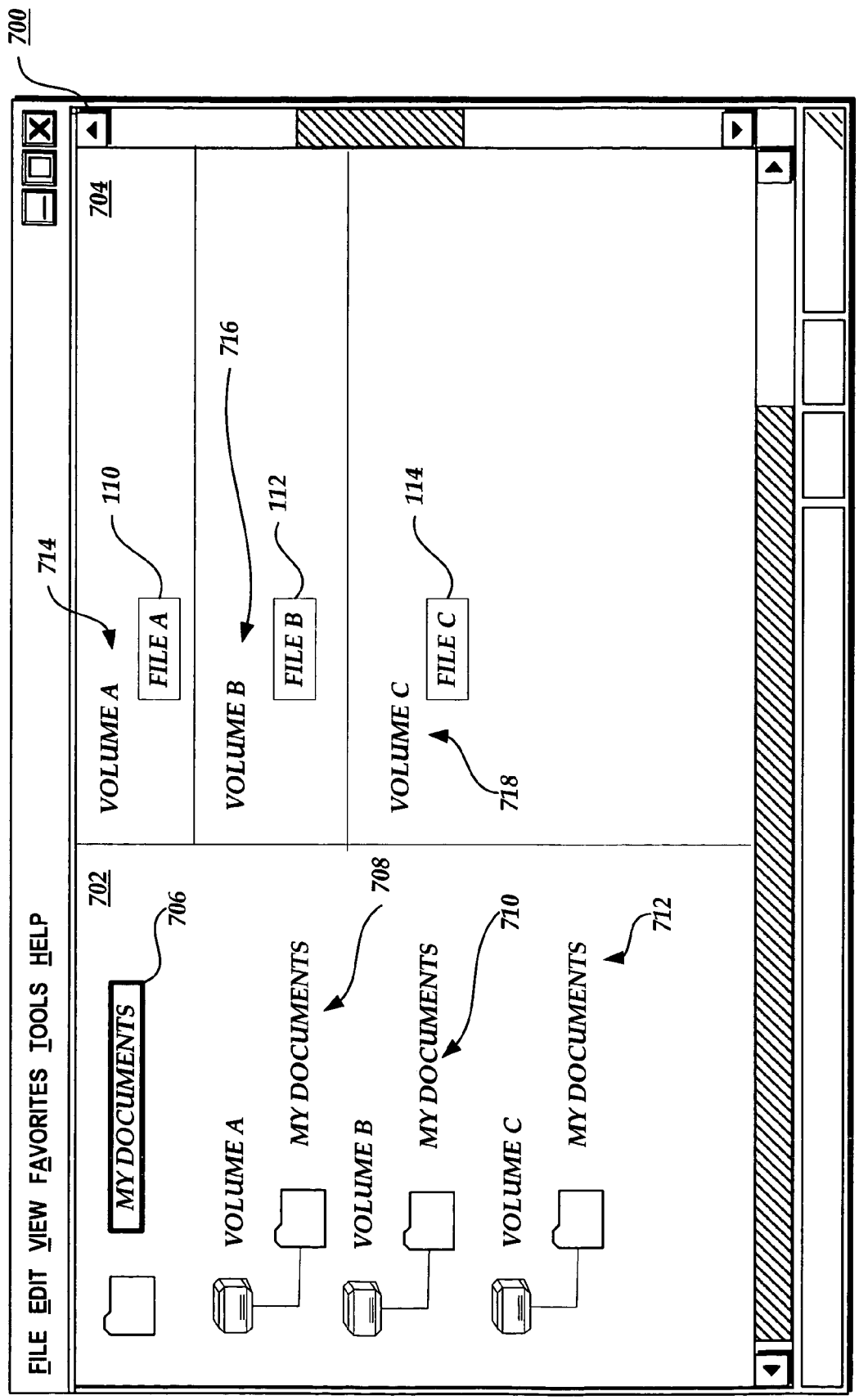
Figure 7D:
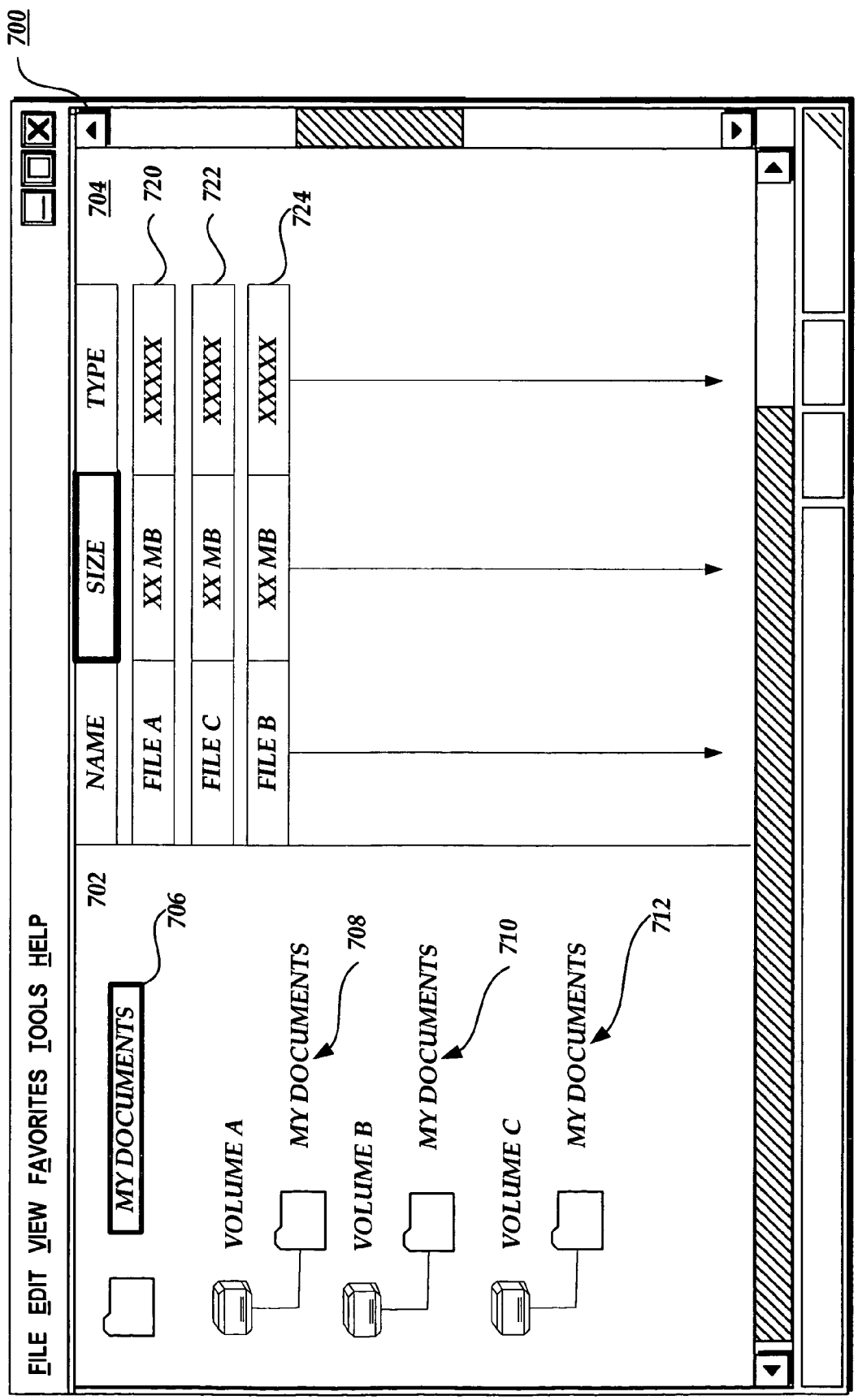

Referring to FIGS. 7C and 7D, the computing device may automatically sort the merged matching content requests. Additionally, the computing device can obtain user input to sort the merged matching content requests. In one illustrative embodiment of the present invention, the merged matching content can be grouped according to the location of the content. With reference to FIG. 7C, the screen display 700 may include additional identifiers 714, 716, 718 that indicate that the identity of the location. Additional levels of storage locations may be also be displayed on the screen display 700. In another embodiment of the invention, the merged matching content may be grouped according to various attributes of the data. With reference to FIG. 7D, the screen display can include a list view that displays the title of the data, the size of the data in storage and the type of data file. If the data were sorted by size as illustrated in FIG. 7D, File A 720 would be at the top of the list, followed by File C 722, and File B 724. In this illustrative embodiment, a user could change the sorting criteria by manipulating the screen display 700. Although FIGS. 7C and 7D illustrate various sorting examples, one skilled in the relevant art will appreciate that additional sorting criteria and/or screen displays would also be included within the scope of the present invention.

Figure 8:
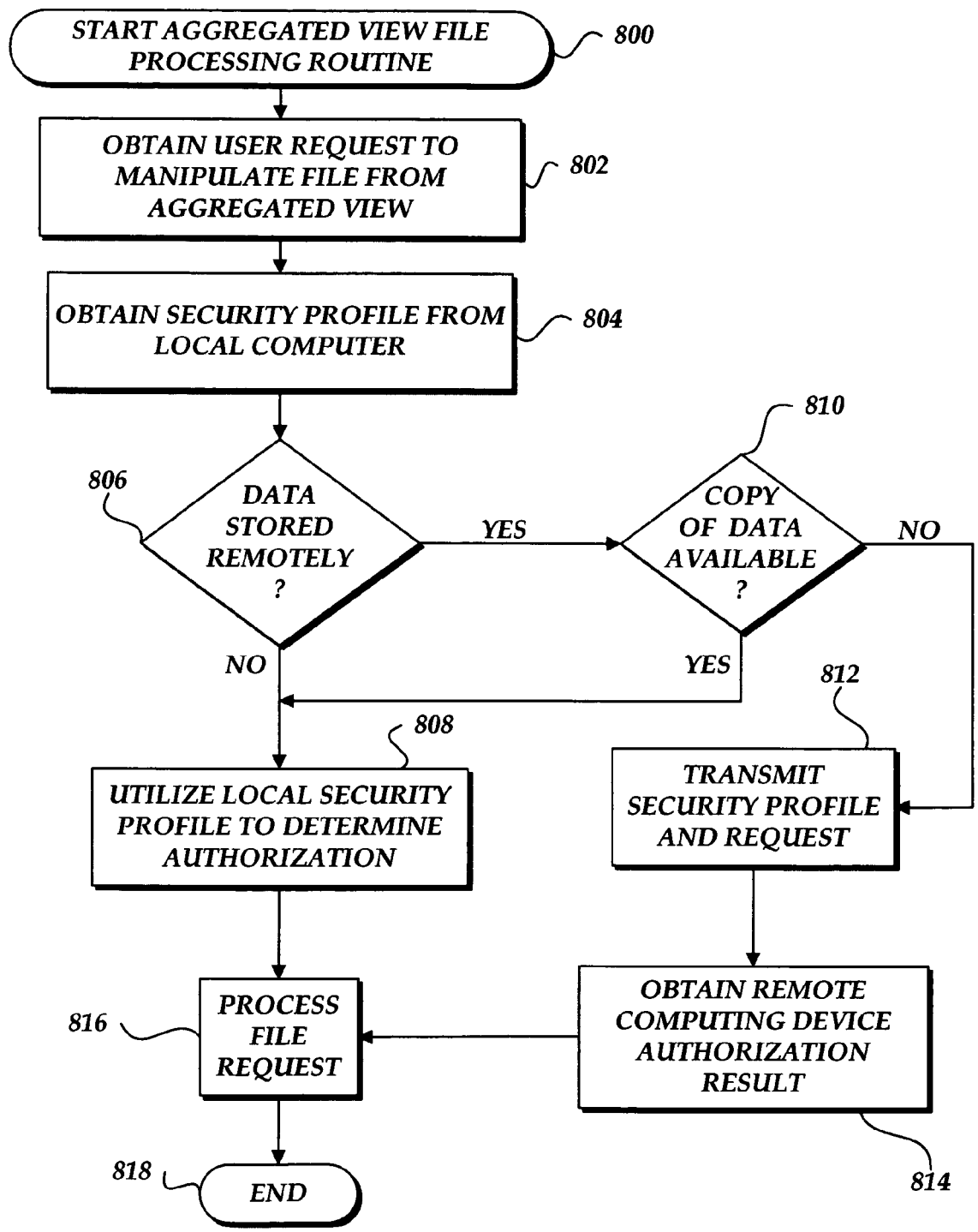
FIG. 8 is a flow diagram illustrative of an aggregated view remote document processing routine implemented by a networked computing device in accordance with an illustrative aspect of the present invention.

Referring to FIG. 8, a routine 800 for manipulating content in an aggregated view will be described. At block 802, a request to manipulate content displayed in an aggregated view is obtained. One skilled in the relevant art will appreciate that the manipulation of content can include opening a data file with a host software application, modifying content, deleting content, copying content and or moving the content. At block 804, the requesting computing device obtains a security identifier from the local security information database 108.

At decision block 806, a test is conducted to determine whether the selected content is stored locally. If the content is stored locally, at block 808, the computing device processes the request with the local security information to determine whether the user is authorized to manipulate the selected content. If the content is not stored locally, at decision block 810, a test is conducted to determine whether a copy of the requested data is maintained locally by the computing device. In an illustrative embodiment of the invention, the computing device may maintain copies of previously accessed documents in a volatile memory, such as a computing device cache. If a copy of the file is available locally, the routine 800 proceeds to block 808 to process the request with local security information, as described above. If a copy of the requested file is not maintained locally, at block 812, the requesting computing device transmits the particular user's security information as a token along with a request to manipulate the content to the computing device actually storing the content. The receiving computing device then utilizes the security token to process the request and transmits a response. At block 814, the sending computing device receives the response from the receiving computing device. If the manipulation is authorized at block 808 or at block 812, the user is allowed to manipulate the content at block 816. The routine 800 terminates at block 818.

In addition to querying for content (data objects) with distributed storage in a networked computer system (e.g., network 100 as shown in FIG. 2) as previously discussed, a user often uses several computer systems. The user, for example, may have a desktop computer at home or work and a laptop computer that the user uses while on travel. In such cases, the user may create or modify files on one computer system. The user often wishes to synchronize files (that the user creates or modifies on one computer system) with another computer system. The following illustrative embodiments of the invention support the synchronization of data objects for associated user scenarios.

Figure 9:
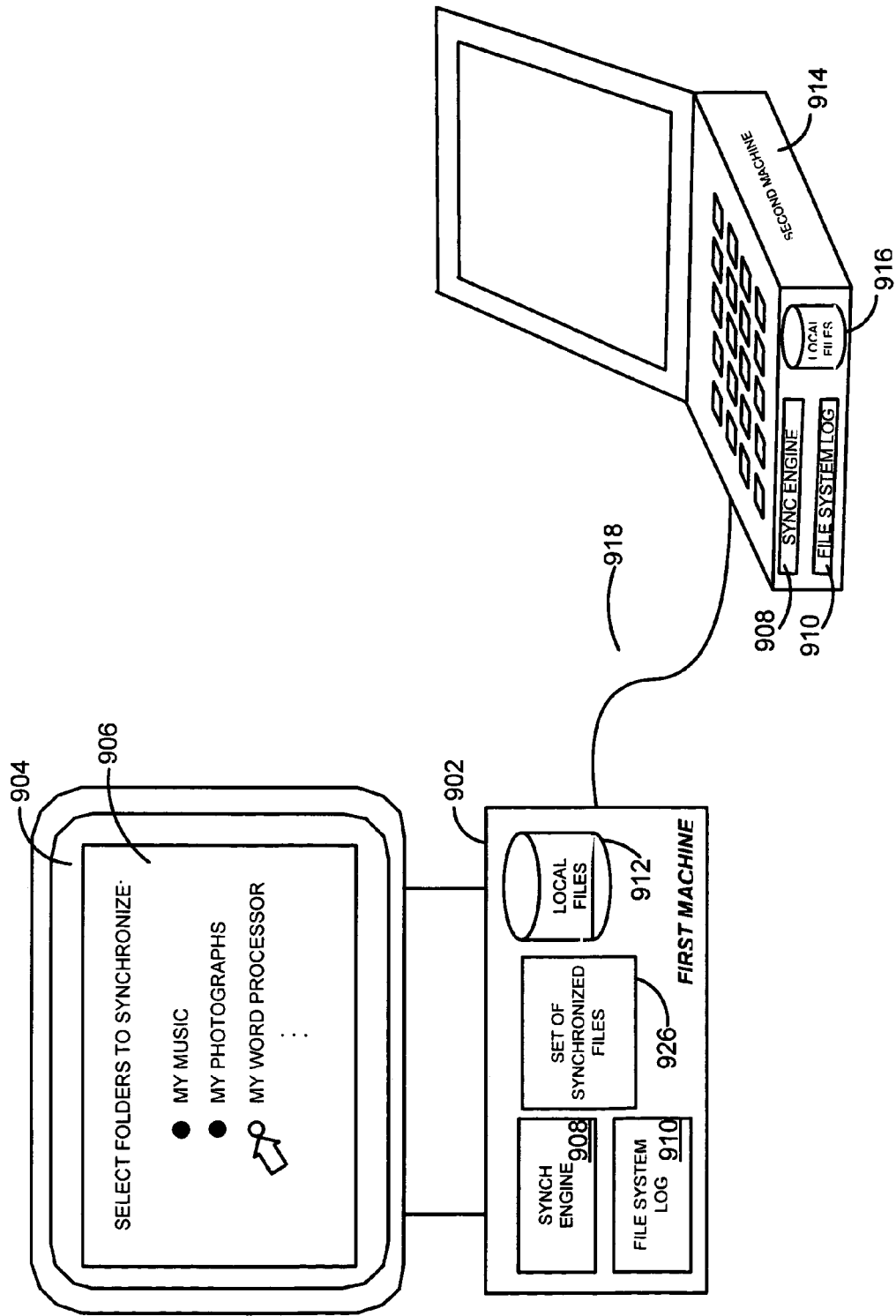
FIG. 9 illustrates an environment in which a system and method for automated peer-to-peer file synchronization may operate, according to illustrative embodiments of the invention.

FIG. 9 illustrates an environment in which a system and method for peer-to-peer synchronization of files or other content may operate, according to an illustrative embodiment of the invention. A user may use or access a set of multiple computers, clients or other machines for business, personal or other uses, including a first machine 902, illustratively a desktop computer, and a second machine 914, illustratively a laptop or other mobile computer. Other computers, clients or other machines may be synchronized, including, for example, network-enabled cellular telephones, network-enabled email clients, network-enabled personal digital assistants, network-enabled media players, or other hardware. In operation as shown, the first machine 902 and second machine 914 may be connected via connection 918, such as a Universal Serial Bus connection, FireWire™ connection, BlueTooth™ connection, WiFi™ connection, or other wired, wireless, optical or other channel or connection. According to illustrative embodiments of the invention, connection 918 may be continuously maintained as in a local area network (LAN) or otherwise, or in some embodiments be connected intermittently between two or more participating machines.

According to illustrative embodiments of the invention, the first machine 902 may generate and present a user interface 904, such as a graphical user interface, command line interface, voice-activated or other interface to allow the user to access applications, files, operating system and other resources. According to illustrative embodiments as shown, the user may access a synchronization interface 906 to activate, select and manage file or other synchronization functions. The synchronization interface 906 may be hosted within an operating system of first machine 902, or in further embodiments may be incorporated in one or more applications, modules or other resources. According to illustrative embodiments as shown, the synchronization interface 906 may present the user with selections and options for identifying, activating and managing synchronization events between first machine 902 and second machine 914, or other machines or targets. In general, those synchronization activities may involve the synchronization of selected or discovered files, folders, directories, volumes, disks or other content, information, storage or media between participating machines.

According to illustrative embodiments of the invention, the user may manipulate the synchronization interface 906 to select a set of synchronized files 926 for synchronizing or roaming across participating machines or systems. The set of synchronized files 926 may, for instance, contain files or other content identified from within a set of local files 912 stored on first machine 902, as well as from within another set of local files 916 stored on second machine 914, or other files or information. The set of synchronized files 926 may be identified, stored and managed by a sync engine 908 hosted in first machine 902. The sync engine 908 may communicate with a file system log 910 maintained in first machine 902, to track and record the state of files, folders, directories, volumes or other content or information designated for synchronization or roaming in the set of synchronized files 926, or otherwise. In illustrative embodiments, the second machine 914 or other or further participating machine may likewise maintain the same or similar logic in the form of another instance of sync engine 908, file system log 910 and other file management resources, each of which in embodiments may again be hosted in an operating system or other resources.

According to illustrative embodiments of the invention, the set of synchronized files 926 may also be configured to include a user's most commonly used directories, folders or other sources, for example, illustrative folders such as My Documents, My Music, Desktop, Favorites, or other folders or sources. Commonly used directories, folders or other sources may be configured to automatically advertise their availability for synchronizing to sync engine 908 or other resources for easy selection or activation by the user by accepting or highlighting those sources and a sync destination. Folders, directories or other sources may be selected or configured for synchronizing which are not specific to one user, e.g., folders or other content which are global to the synchronizing system including task-oriented project folders, public folders such as folders of the form c:\users\public, or other folders, directories or other sources. In these and other embodiments of the invention, folders, directories and other sources may be automatically discovered by discovery logic on any one or more machine, in addition to or instead of manual specification of that content. Likewise, in some embodiments of the invention, in addition to or instead of manually registering an address or identifier for destinations machines, machines which may be candidates for inclusion in the set of participating machines may also be automatically detected using discovery logic, such as logic which may detect machines connected on a local area network, or otherwise.

For purposes of sync management, the sync engine 908 in first machine 902, second machine 914 or otherwise may detect the connection status of first machine 902, second machine 914 or other machines or hardware to determine those occasions when those machines enjoy connectivity between each other or other participating hardware, via connection 918 or other connections or channels. For example, the sync engine 908 may establish a connection through available communication ports of first machine 902, second machine 914 or other participating machines, including tunneling through firewall resources as appropriate.

When connectivity is established, e.g., via USB or wireless connections, the sync engine 908 in first machine 902 may authenticate the participating machines to ensure that file synchronization is being properly initiated. When an authenticated connection is verified, the sync engine 108 in first machine 902 may initiate automatic file roaming, imaging or synchronization activity between the participating machines. For example, the sync engine 908 in first machine 902 may access the set of synchronized files 926 to determine which files, folders, directories, volumes or other content located on first machine 902 need to be transferred to second machine 914, and likewise which similar content located on second machine 914 need to be transferred to first machine 902 to maintain a coherent or consistent set of files or other information between those machines.

The sync engine 908 in first machine 902 may thus examine the file system log 910 of first machine 902 or the file system log 910 of second machine 914 in order to examine the state, behavior or history of the files and other content on the participating machine. The state, behavior, history or other metadata or information regarding the set of synchronized files 926 may include not merely date-stamp information indicating the most recent editing, downloading or accessing of a file, but further information such as file size, file type, information regarding previous versions or transmissions of a file, and other information.

Accessing this and other information regarding the state of the file and other content on participating machines, the sync engine 908 of first machine may delete, copy, edit, reformat, change the stored location of, or otherwise manipulate the set of synchronized files 926 in one or more locations. These actions may be performed to ensure that the same version of a given file is maintained in first machine 902, second machine 914 and other participating machines. According to illustrative embodiments of the invention, the sync engine in first machine 902 may apply delta synchronizing logic to the processed files in order to cause only those files or portions of files which have changed since the last synchronization or other point to be roamed between participating machines. In illustrative embodiments of the invention involving corporate or other organizational LANs, a systems administrator may set the sync engine 908 of first machine 902 or other machines to restrict the propagation of certain files to certain users, or apply other synchronization controls. When permissions are applied, it may be noted that permissions should be arranged so that the data can properly migrate through to all participating machines to ensure connection paths to all necessary destinations. Other configurations are possible in accordance with embodiments of the invention.

According to illustrative embodiments of the invention, the user, administrator or operating system settings may set the sync management, file transfer and other activities carried out by the sync engine 908 of first machine 902, the sync engine 908 of second machine 914 or other resources to execute at a desired level of priority to operate as a background task, or to suspend and resume file transfer activities until broadband connectivity is established or reestablished, or take other actions at other times or under other conditions. According to illustrative embodiments of the invention, first machine 902, second machine 914 or other participating machines, clients, devices or hardware may, for instance, be identified by a domain name service (DNS) or other address or identifier. The sync engine 908 of first machine 902, sync engine 908 of second machine 914 or other sync engine instances or logic may employ automatic discovery logic to detect when other participating machines appear on the Internet or other networks, so that the machines may resume synchronizing activity with other machines at any point during which they enjoy Internet or other connectivity.

The user may selectively or arbitrarily choose those files or other source content the user wishes to replicate, roam or synchronize among the user's set of participating machines, from any one or more of those machines, without restriction. Moreover, the first machine 902, second machine 914 and any other participating machines may share a set of synchronized files 926 on a group basis, but those machines do not need to be directly connected together or connected together at the same time to carry out the synchronization operations of the invention. Rather, synchronization activity may take place automatically and opportunistically depending on connection, network and other conditions for each machine or subgroup or sub-network of machines. (It may be noted that in such illustrative embodiments, the set of participating machines may nevertheless be able to achieve a fully bridged or connected network on an overall or cumulative basis, even if machines, subgroups or sub-networks of machines connect at different times, different places or using different types of network connections). A user may choose to designate all files located on first machine 902, second machine 914 or otherwise to be roamed or synchronized to another participating machine, to affect a backup of those source files, if desired.

Figure 10:
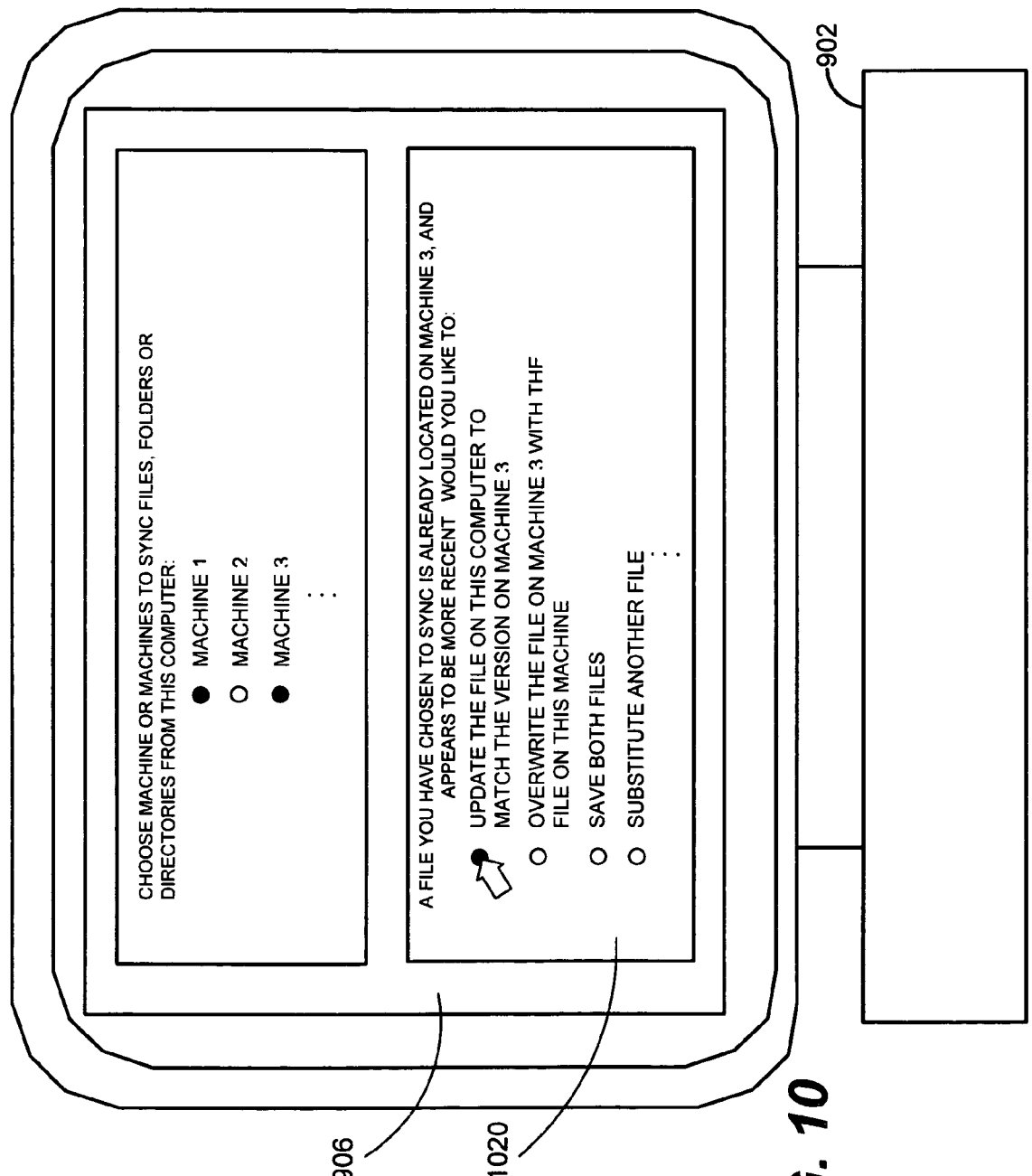
FIG. 10 illustrates an interface depicting file version management logic which may be used in conjunction with file synchronization, according to illustrative embodiments of the invention.

According to illustrative embodiments of the invention in FIG. 10, the sync logic 908 of first machine 902, the sync logic of second machine 914 or other logic or instances may apply version management logic 1020 in conjunction with the carrying out file transfers and updates. In the illustrative embodiments as shown, when sync logic 908 detects a version conflict between two instances of a file (e.g., an older file is being prepared to overwrite a newer version of that same file), the version management logic 1020 may present the user with a dialogue or query to resolve that conflict to rename or move the obsolete file, to substitute another version of the file, or take other action. Other version-based and other conflicts may be detected. In some embodiments, rather than or in addition to presenting the user with a rich interface for exception handling, the version management logic 1020 may also apply automatic rules or processing to conflicting files or data, such as executing a compare function to edit or save conflicting files, or otherwise processing the differing versions.

Figure 11:
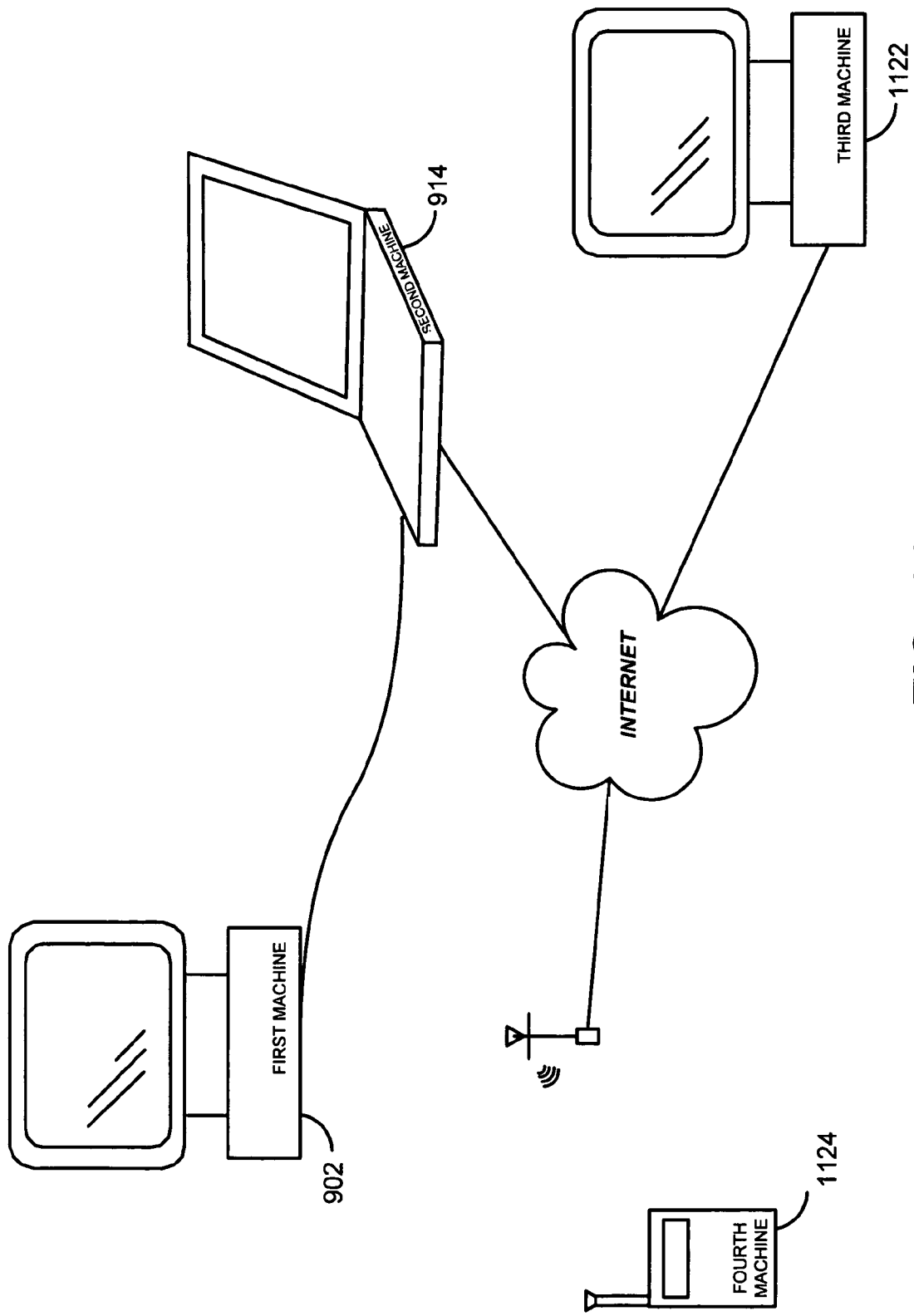
FIG. 11 illustrates an environment in which a system and method for peer to peer synchronization of files may operate with more than two participating machines, according to certain illustrative embodiments of the invention.

It may again be noted that in illustrative embodiments of the invention, such as in FIG. 11, more than two machines may participate in file synchronization and related functions on the same automatic basis. A collection of machines as shown may include at least a first machine 902, second machine 914, third machine 1122, fourth machine 1124 or further machines, clients, computers or devices to synchronize selected file or other content. In illustrative embodiments, the machines may be connected directly via a wired connection such as connection 918 illustrated in FIG. 9, or by other wired, wireless or optical connection, including air interfaces for network-enabled cellular telephones. However, the user may initiate selective synchronization of desired files with comparatively little configuration effort, and without the need for or reliance on an intermediate storage, logic or control resource such as an Internet backup server. Embodiments of the invention may therefore enhance the reliability, speed and inter-operability of file roaming operations.

Figure 12:
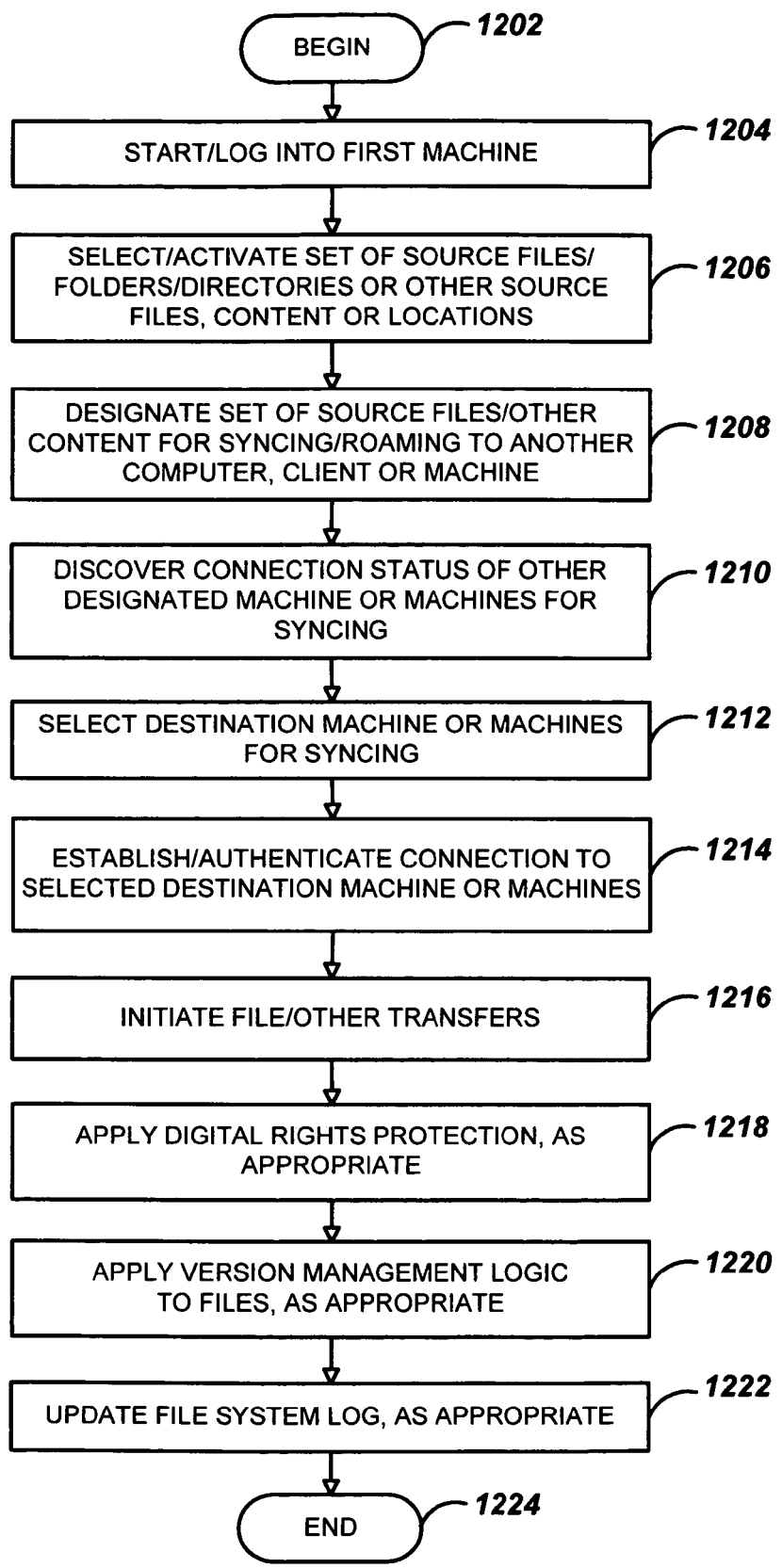
FIG. 12 illustrates a flowchart of overall file roaming and synchronization processing, according to illustrative embodiments of the invention.

FIG. 12 illustrates overall file sharing and synchronization processing, according to illustrative embodiments of the invention. In step 1202, processing may begin. In step 1204, a user may start or log into a first machine 902, such as a personal computer, laptop or mobile computer, a network-enabled cellular telephone, or other client, machine, hardware or device. In step 1206, the user may select or activate a set of source files, folders, directories or other source files, source locations, or other information or content, highlighting a set of files on the first machine 902 or other location. In step 1208, the user may designate a set of synchronized files 926 to be automatically synchronized and managed among a set of working computers or other machines. In step 1210, the network connection status of the designated machine or machines may be automatically discovered by sync engine 908 or other logic. In step 1212, the user may select or the sync engine 908 may retrieve, a stored designation of one or more destination machines for file or other data synchronizing.

In step 1214, a connection 918 such as a USB or other wired or wireless connection may be established and authenticated to connect to the selected machine or machines, such as a second machine 914 or other computer, machine, client or hardware. In step 1216, the sync engine 908 or other control logic may initiate file transfers of the set of synchronized files 926 or other content transmission between the first machine 902 and the second machine 914. In step 1218, the sync engine 908 of either the first machine 902 or second machine 914 or both may apply digital rights management or protection logic to the set of synchronized files 926 or other content being transferred. The sync engine 908 of any one or more participating machine may automatically seek authorization or licenses to replicate the file or content, such as music or other media content. In the event that authorization is denied, the operative sync engine 908 may delete the unauthorized file or files from the target machine, notify the user that an unauthorized copy has been removed, or take other action.

In step 1220, the sync engine 908 of either the first machine 902 or second machine 914 or both may apply version management logic 1020 to the set of synchronized files 926 or other content being transferred to trap instances of inconsistent versions of files, of obsolete versions of files being attempted to be copied over newer versions, or detect other version conflicts. The version management logic 1020 may present the user with a dialogue to obtain their preferred disposition of version conflicts, such as to roam the most current version of a file, to rename or back up obsolete versions of files, to substitute other files for versions in conflict, or take other action. In step 1222, the sync engine 908 or other logic in one or more of the participating machines may update the file system log 910 in that corresponding local machine or hardware. In step 1224, processing may repeat, return to a prior processing point, jump to a further processing point or end.

In illustrative embodiments of the invention, the user may query a networked computer system for data objects as well as initiate the synchronization of selected data objects over multiple computers in the network computer system. (A data object is an individually addressable unit information. Examples of data objects include files, folders, directories, and electronic media.) Illustrative embodiments of the invention, as will be discussed, support user scenarios in which data objects may be replicated over multiple computers where the user queries the network computer system for specified data objects.

Figure 13A:
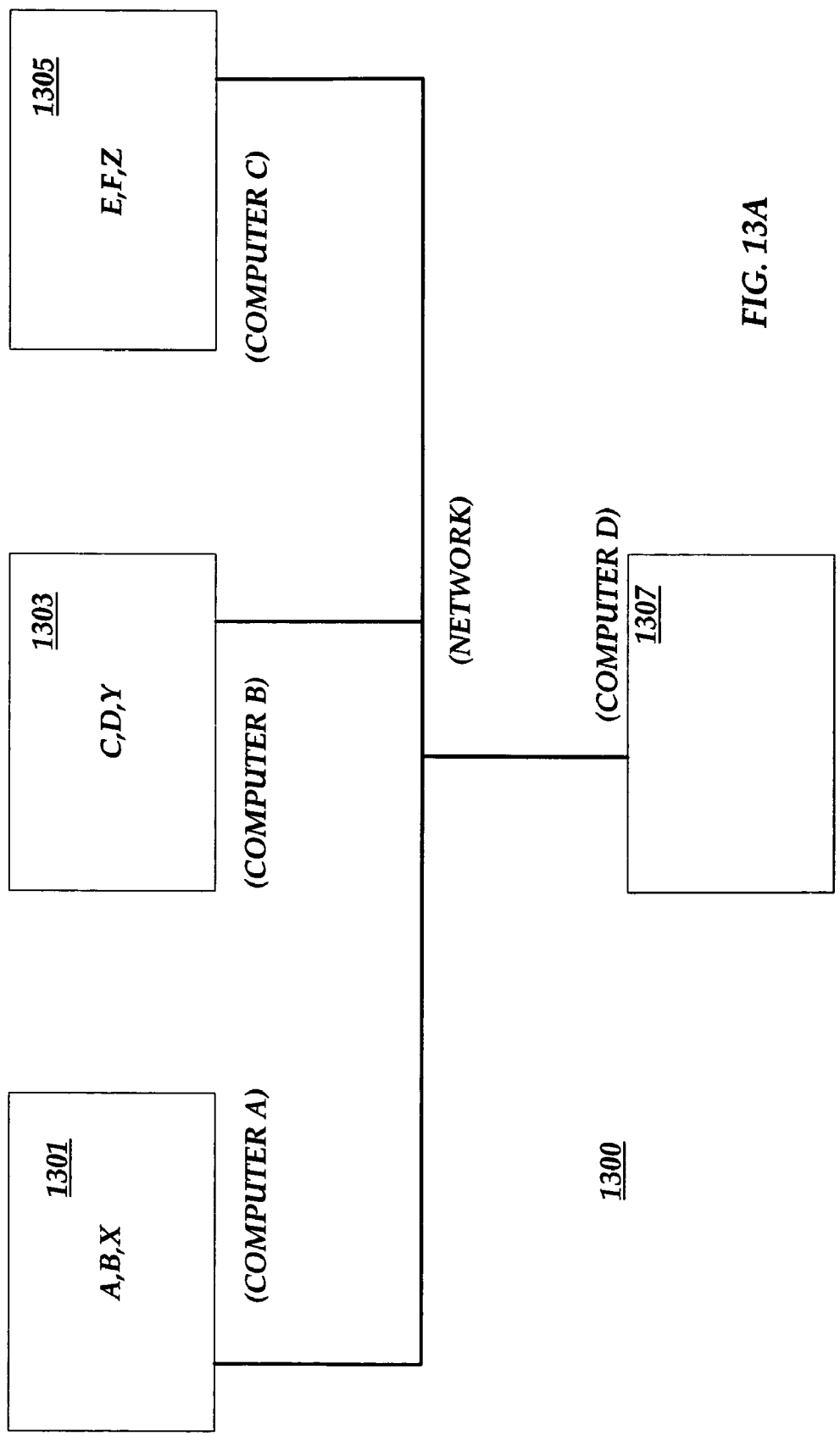
FIGS. 13A-C illustrate scenarios for query results with distributed storage in a computer network in accordance with an illustrative embodiment of the invention.
Figure 13B:
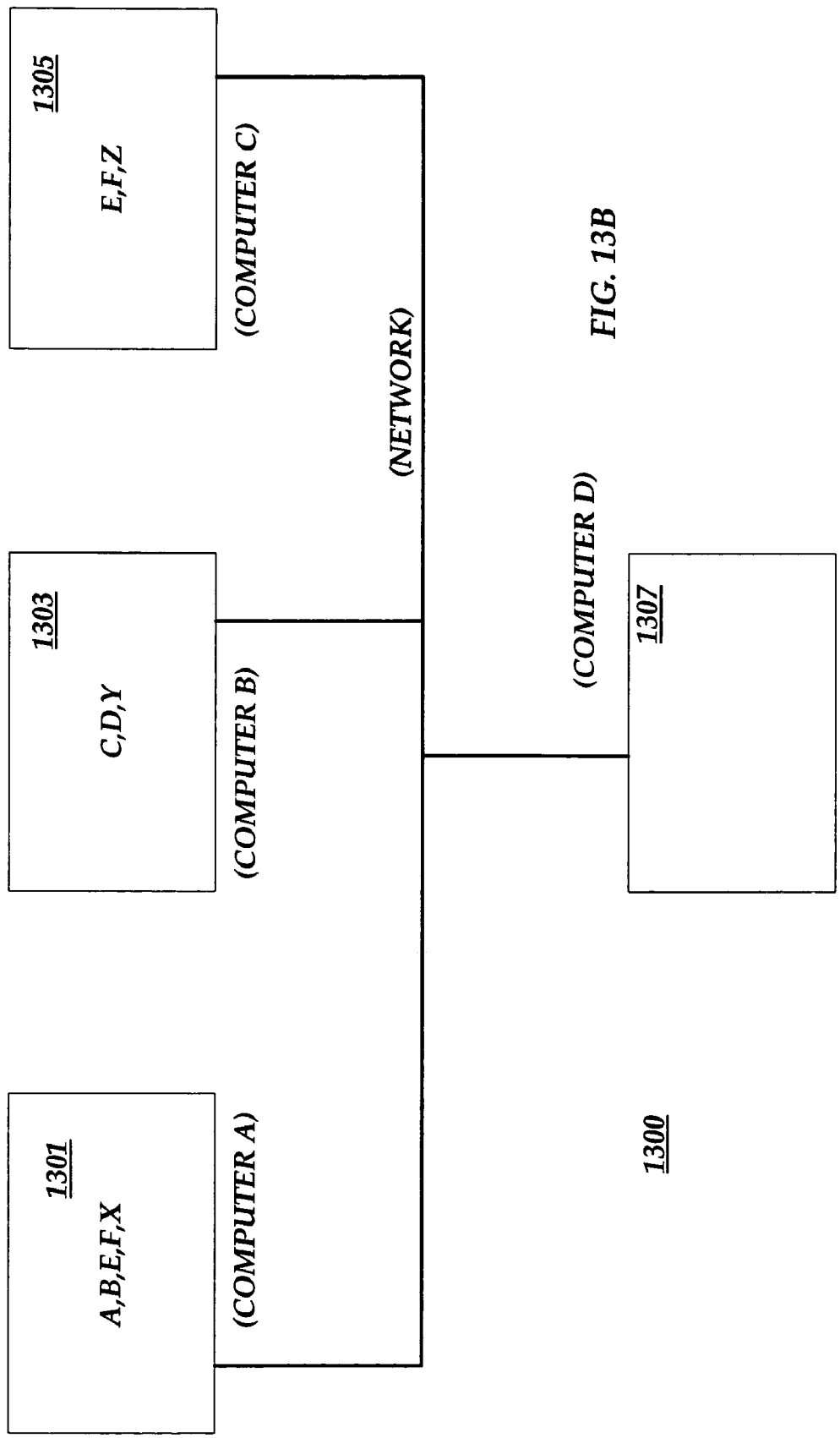
Figure 13C:
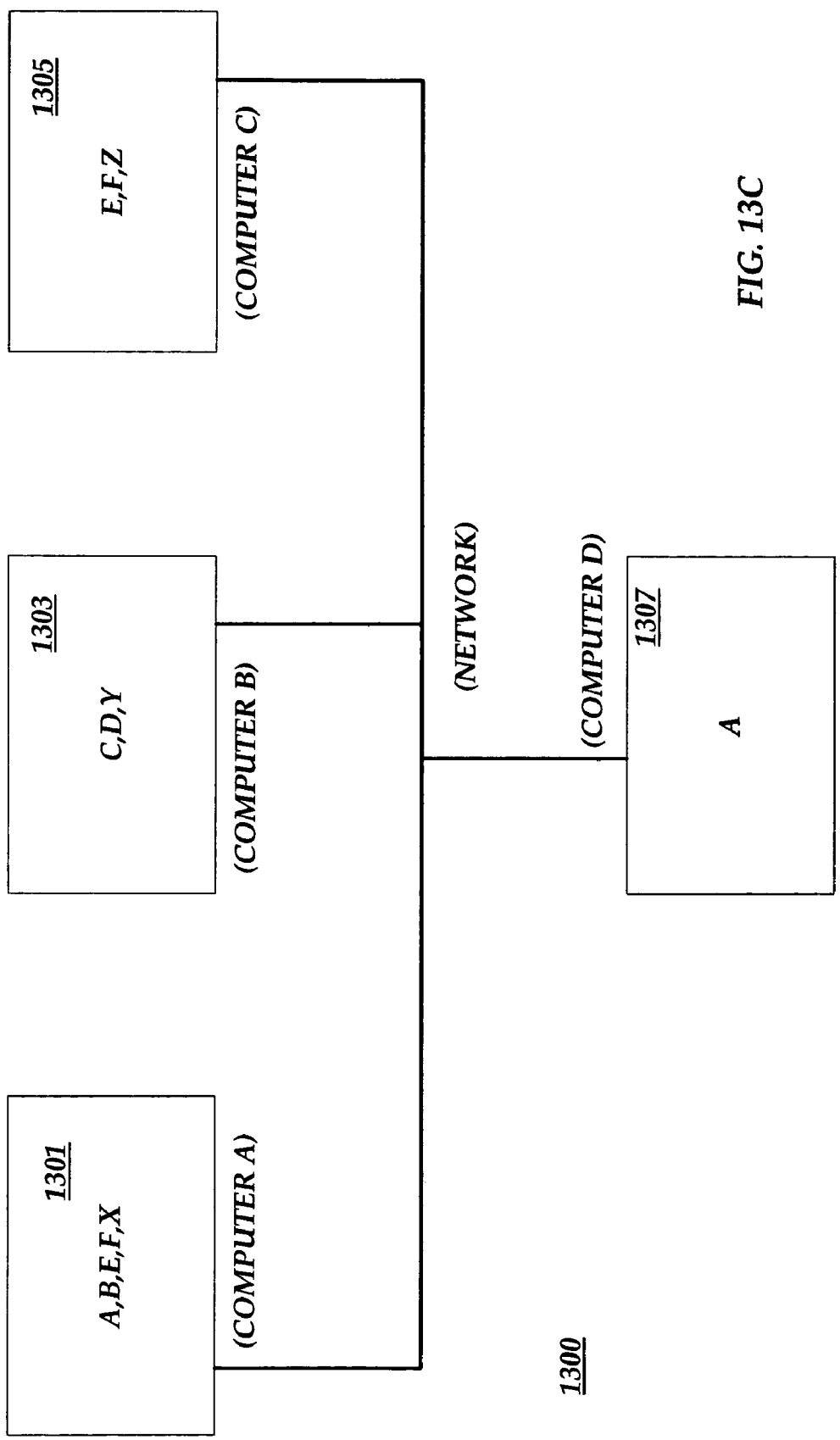

FIGS. 13A-C illustrates scenarios for query results with distributed storage in a computer network in accordance with an embodiment of the invention. The scenarios in FIGS. 13A-C corresponds to a computer network consisting of personal computers 1301, 1303, 1305, and 1307. As an example, the user of computer 1307 queries files that were created on Jun. 17, 2004 when the user worked from home on the user's networked desktop and laptop. In the example, files A and B are documents that the user created on computer 1301, files C and D are documents that the user created on computer 1303, and files E and F are files with music content. Files X, Y, and Z (as associated with computers 1301, 1303, and 1305, respectively) were created on a date different than Jun. 17, 2004.

Referring to FIG. 13A, computer 1301 stores files A and B, computer 1303 stores files C and D, and computer 1305 stores E and F. The user at computer 1307 generates a request to query network 1300 to obtain the identification of data objects that were created on Jun. 17, 2004. Computer 1307 subsequently sends query requests with the date criterion (Jun. 17, 2004) to computers 1301, 1303, and 1305. Consequently, computer 1307 receives a response from computer 1301 with identities for files A and B, a response from computer 1303 with identities for files C and D, and a response from computer 1305 with identities for files E and F. Computer 1307 combines the identities for the specified data objects from the responses and presents the query result to the user.

The scenario shown in FIG. 13B is similar to FIG. 13A except that files E and F have been replicated to computer 1301. (Replication of files was previously discussed, e.g., FIG. 12.) Thus, computer 1301 stores files A, B, E, and F, computer 1303 stores files C and D, and computer 1305 stores files E and F. The user at computer 1307 generates a request to query network 1300 to obtain the identification of data objects that were created on Jun. 17, 2004. Computer 1307 then sends query requests with the date criterion (Jun. 17, 2004) to computers 1301, 1303, and 1305. Consequently, computer 1307 receives a response from computer 1301 with identities for files A, B, E, and F, a response from computer 1303 with identities for files C and D, and a response from computer 1305 with identities for files E and F. Computer 1307 combines (merges) the identities for the specified data objects from the responses and presents the query result to the user. However, as will be discussed in greater detail in FIG. 14, computer 1307 determines that files E and F as identified by computer 1301 are the same files E and F that are identified by computer 1307. Consequently, the query result that is displayed to the user contains files E and F only once. Thus, the query result indicates files A, B, C, D, E, and F rather than files A, B, E, F, C, D, E, and F. A replicated file typically has the same name across target machines. However, embodiments of the invention support replicated files having different names.

The scenario shown in FIG. 13C is similar to FIG. 13A except that files E and F have been replicated to computer 1301 and file A has been replicated to computer 1307. Thus, computer 1301 stores files A, B, E, and F, computer 1303 stores files C and D, computer 1305 stores files E and F, and computer 1307 stores file A. The user at computer 1307 generates a request to query network 1300 to obtain the identification of data objects that were created on Jun. 17, 2004. Computer 1307 subsequently sends query requests with the date criterion (Jun. 17, 2004) to computers 1301, 1303, and 1305. However, computer 1307 already has replicated file A and does not query computer 1301 about file A. (In an embodiment, when computer 1307 queries for results, computer 1307 examines its cached results first. If computer 1307 finds a file, then computer 1307 modifies the outgoing query for machine 1301 so that machine 1301 is queried only for files that are not present on computer 1307.) Consequently, computer 1307 receives a response from computer 1301 with identities for files B, E, and F, a response from computer 1303 with identities for files C and D, and a response from computer 1305 with identities for files E and F. Computer 1307 combines the identities for the specified data objects from the responses and presents the query result to the user.

Figure 14:
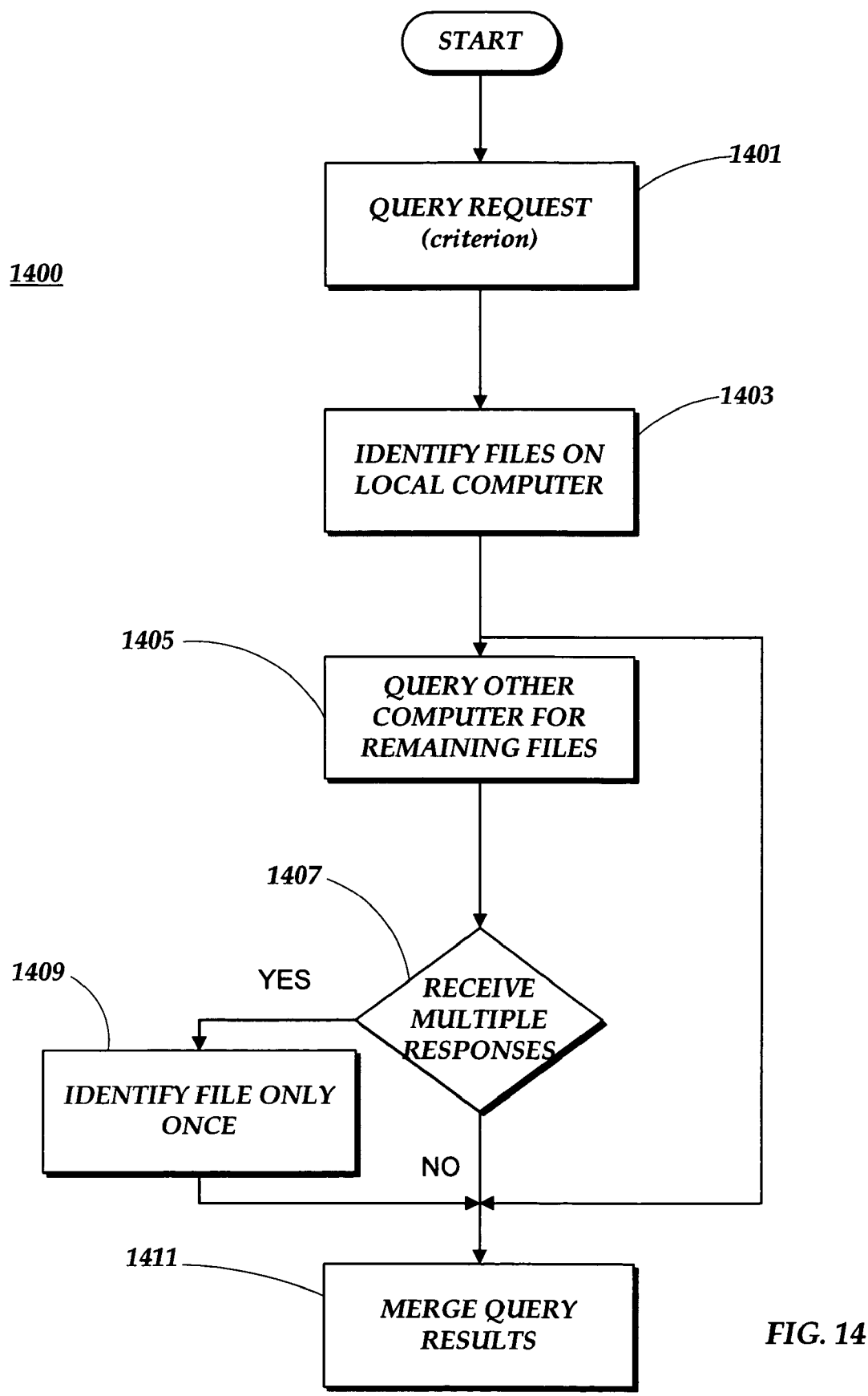
FIG. 14 shows a flow diagram that supports queries to networked computers with distributed storage in accordance with an illustrative embodiment of the invention.
Figure 15:
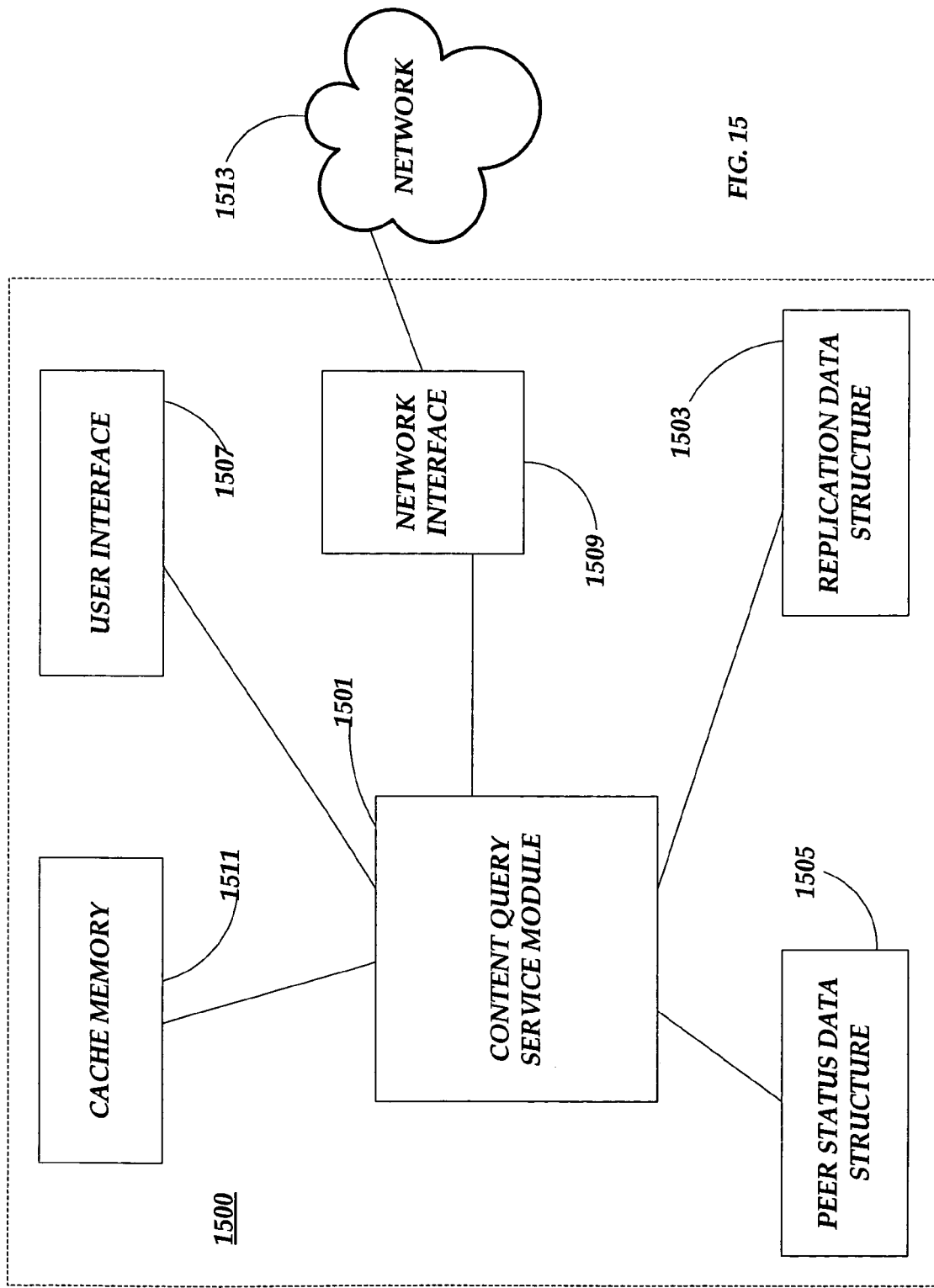
FIG. 15 shows a computer system that queries networked computers with distributed storage in accordance with an illustrative embodiment of the invention.

FIG. 14 shows flow diagram 1400 that supports queries to networked computers with distributed storage in accordance with an illustrative embodiment of the invention. In step 1401, the user's computer (e.g., computer 1307) receives a query request through a user interface (e.g., user interface 1507 as shown in FIG. 15). In step 1403, the user's computer (local computer) determines replicated data objects on the user's computer and does not query networked computers (remote computers) about replicated data objects that are stored on the user's computer. Consequently, performance for executing the query may be enhanced. In step 1405, the user's computer queries the networked computers about the remaining data objects. The user's computer receives responses from the networked computer in step 1407. In step 1409, a specified data object is identified only once. Step 1411 merges the identities of the specified data objects that are stored on the networked computers as well as data objects that are stored on the user's computer. The query result, as determined by step 1411, may be displayed to the user through the user interface.

In addition to process 1400 providing a single view of specified objects in the networked computer system, process 1400 may be extended so that specified objects that are not stored on a networked computer may be replicated to the networked computer. For example, as shown in FIG. 13C, query results show files A, B, C, D, E, and F while only file A is stored at computer 1307. File synchronization may then be initiated so that files B, C, D, E, and F are also stored on computer 1307.

FIG. 15 shows computer system 1500 that queries networked computers with distributed storage through network 1513 in accordance with an illustrative embodiment of the invention. In an illustrative embodiment of the invention, computer system 1500 is based on a computer platform as shown in FIG. 1. Computer system comprises content query service module 1501, replication data structure 1503, peer status data structure 1505, user interface 1507, network interface 1509, and cache memory 1511. User interface 1507 may interface to user input devices (e.g., a keyboard) and user output devices (e.g., a display device).

When requested by a user through user interface 1507, content query service module 1501 executes process 1400 as shown FIG. 14. Content query service module 1501 queries networked computers and receives responses from the networked computers through network interface 1509 and network 1513. If content query service module 1501 determines that a networked computer is off-line, then content query service module 1501 refrains from sending a query to the off-line networked computer. In such a case, content query service module 1501 may query cache memory (local volatile memory) 1511) about the most recently accessed data objects from the off-line networked computer.

Also, content query service module 1501 stores information about replicated data objects in replication data structure 1503. For example, if a file that is stored on computer system 1500 is also replicated on a networked computer, content query service module 1501 does not query networked computers about the replicated data object. In an embodiment of the invention, content query service module 1501 uses a search index to determine where a file resides. If a file has been replicated locally, then the search index on the local machine will contain the name of the file.

When content query service module 1501 receives responses from the networked computers, content query service module 1501 merges the identifications of the selected data objects and may display the query result to the user through user interface 1507.

As can be appreciated by one skilled in the art, a computer system with an associated computer-readable medium containing instructions for controlling the computer system can be utilized to implement the illustrative embodiments that are disclosed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-readable medium having computer-executable instructions stored thereon in a local computer system connected to a computer network, said instructions configured to perform a method comprising the steps of:
   (a) obtaining a request to identify specified data objects in accordance with a criterion;
   (b) querying the local computer system for a first specified data object, a second specified data object, and a third specified data object;
   (c) receiving an indication that the first specified data object is stored on the local computer system, and that the second specified data object and the third specified data object are not stored on the local computer system, wherein the first specified data object is included in a local identification set;
   (d) in response to receiving the indication that the second specified data object and the third specified data object are not stored on the local computer system, querying a first computer system in the computer network for the second specified data object and the third specified data object such that the first computer system is not queried for the specified data objects that correspond to the specified data objects in the local identification set that are stored on the local computer system;
   (e) obtaining a first identification set of the specified data objects that are stored at the first computer system, wherein the first identification set includes the second specified data object;
   (f) querying a second computer system for the third specified data object;
   (g) determining that the second computer system is not currently available;
   (h) recalling a previously stored content request result for the second computer system that includes the third specified data object;
   (i) receiving a second identification set of the specified data objects that are stored at the second computer system, wherein the second identification set includes the third specified data object;
   (j) maintaining only one identification for a replicated data object that is contained in more than one of the first identification set and the second identification set;
   (k) merging the local identification set, the first identification set, and the second identification set to form a merged identification set; and
   (l) displaying the merged identification set, wherein the specified data objects in the second identification set are visually distinguished from the specified data objects in the local and the first identification sets by one or more of a dotted border, being semi-transparent, or being highlighted to indicate that one or more of the specified data objects in the merged identification set are stored on the second computer system and cannot currently be accessed.

2. The computer-readable medium of claim 1, having computer-executable instructions further configured to perform the step of:
   (m) generating a result from the merged identification set.

3. The computer-readable medium of claim 1, having computer-executable instructions further configured to perform the steps of:
   (m) querying a third computer system in the computer network for the specified data objects that are not stored on the local computer;
   (n) obtaining a third identification set of the specified data objects that are stored at the third computer system;
   (o) if the first identification set, the second identification set, and the third identification set contain a corresponding identification of a replicated data object, maintaining only one identification for the replicated data object; and
   (p) merging the local identification set, the first identification set, the second identification set, and the third identification set to form the merged identification set.

4. The computer-readable medium of claim 2, wherein (m) includes computer-executable instructions further configured to perform the step of:
   displaying the result to a user.

5. The computer-readable medium of claim 1, wherein (a) includes computer-executable instructions further configured to perform the step of:
   determining that the specified data objects are associated with a unique identifier corresponding to a user.

6. The computer-readable medium of claim 5, wherein the user is an owner of the specified data objects.

7. The computer-readable medium of claim 2, wherein the result is represented without identifying associated locations of the specified data objects.

8. The computer-readable medium of claim 2, having computer-executable instructions further configured to perform the step of:
   (n) grouping the result according to a sorting criterion.

9. The computer-readable medium of claim 8, wherein the sorting criterion corresponds to a location of the specified data objects.

10. The computer-readable medium of claim 1, having computer-executable instructions further configured to perform the step of:
  (m) initiating the request in response to occurrence of a specified event.

11. The computer-readable medium of claim 1, having computer-executable instructions further configured to perform the step of:
  (m) limiting a number of remote computer systems that are queried to identify the specified data objects.

12. The computer-readable medium of claim 1, having computer-executable instructions further configured to perform the step of:
  (m) synchronizing a data object based on the merged identification set.

13. The computer-readable medium of claim 2, having computer-executable instructions further configured to perform the step of:
  (n) highlighting an entry in the result to indicate that an associated data object has been modified since generating a previous result to identify the specified data objects.

14. A computer system having a processor and one or more computer readable media for querying networked computers about data objects distributed in a computer network, the computer system comprising:
  a processor;
  a network interface coupled to the processor that enables the computer system to communicate with a local computer system, a first computer system, and a second computer system in the computer network;
  a user interface module;
  a replication data structure that contains an indication of replicated data objects; and
  a content query service module that,
    receives a request to identify specified data objects in accordance with a criterion from a user through the user interface module,
    queries the local computer system for a plurality of specified data objects,
    receives an indication that a first specified data object is stored on the local computer system such that the first specified data object is included in a local identification set,
    queries the first computer system for a second specified data object in response to receiving the indication that the second specified data object is not stored on the local computer system such that the first computer system is not queried for the specified data objects that correspond to the specified data objects in the local identification set stored on the local computer system,
    obtains a first identification set that includes the second specified data object stored at the first computer system,
    queries the second computer system for a third specified data object,
    determines that the second computer system is not currently available,
    recalls a previously stored content request for the second computer system, wherein the previously stored content request result is a second identification set that includes the third specified data object,
    maintains only one identification for a replicated data object that is contained in more than one of the first identification set and the second identification set, and
    merges the local identification set, the first identification set, and the second identification set to form a merged identification set;
  a display module that displays the merged identification set, wherein the specified data objects in the second identification set are visually distinguished from the specified data objects in the first identification set by one or more of a dotted border, being semi-transparent, or being highlighted to indicate that one or more of the specified data objects in the merged identification set are stored on the second computer system and cannot currently be accessed.

15. The computer system of claim 14, further comprising:
  a peer status data structure that provides status information as to whether a remote computer is off-line; and
  wherein the content query service module blocks a query to the remote computer if the remote computer is off-line.

16. The computer system of claim 15, further comprising:
  a local memory that stores previously accessed data objects from the remote computer; and
  wherein the content query service module obtains an associated identification set of the specified data objects from the local memory with the first identification set and the second identification set.

17. The computer system of claim 16, wherein the local memory comprises a cache memory.

18. A computer-readable medium having computer-executable instructions stored thereon in a local computer system connected to a computer network, said instructions configured to perform a method comprising the steps of:
  (a) obtaining a request to identify specified data objects in accordance with a criterion;
  (b) after querying the local computer system for a first specified data object and a second specified data object, receiving an indication that the first specified data object is stored on the local computer system and that the second specified data object is not stored on the local computer system such that a local identification set includes the first specified data object;
  (c) querying a first computer system and a second computer system for the second specified data object and a third specified data object such that the first computer system and the second computer system are not queried for the specified data objects that correspond to the specified data objects in the local identification set;
  (d) receiving a first identification set corresponding to the first computer system and a second identification set corresponding to the second computer system such that one or more of the first computer system or the second computer system has stored the second specified data object;
  (e) querying a previously networked computing system for the third specified data object;
  (f) determining that the previously networked computing system is not currently available;
  (g) recalling a previously stored content request result for the previously networked computing system, wherein the previously stored content request result is a third identification set of the specified data objects that includes the third specified data object;
  (h) if more than one of the first identification set, the second identification set, and the third identification set contain corresponding identification of a replicated data object, maintaining only one identification for the replicated data object;

(i) merging the local identification set, the first identification set, the second identification set, and the third identification set to form a merged identification set of the specified data objects; and (j) displaying the merged identification set, wherein the specified data objects in the third identification set are visually distinguished from the specified data objects in the first and second identification sets by one or more of a dotted border, being semi-transparent, or being highlighted to indicate that one or more of the specified data objects in the merged identification set are stored on the previously networked computing system and cannot currently be accessed.

* * * * *